(12) United States Patent
Dash et al.

(10) Patent No.: US 12,488,051 B2
(45) Date of Patent: Dec. 2, 2025

(54) FAILURE TOLERANT AND EXPLAINABLE STATE MACHINE DRIVEN HYPERGRAPH EXECUTION

(71) Applicant: Microsoft Technology Licensing, LLC, Redmond, WA (US)

(72) Inventors: Sumeet Priyadarshee Dash, Lake Forest, CA (US); Jose Aguilar Saborit, Bellevue, WA (US); Krishnan Srinivasan, Sammamish, WA (US); Mohammad Shafiei Khadem, Seattle, WA (US); Kevin Bocksrocker, Kirkland, WA (US); Brandon Barry Haynes, Seattle, WA (US); Raghunath Ramakrishnan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 125 days.

(21) Appl. No.: 18/477,168

(22) Filed: Sep. 28, 2023

(65) Prior Publication Data
US 2024/0394311 A1    Nov. 28, 2024

Related U.S. Application Data

(60) Provisional application No. 63/503,643, filed on May 22, 2023.

(51) Int. Cl.
*G06F 16/903* (2019.01)
*G06F 16/901* (2019.01)

(52) U.S. Cl.
CPC .... *G06F 16/90335* (2019.01); *G06F 16/9024* (2019.01)

(58) Field of Classification Search
CPC .................................. G06F 16/90335
See application file for complete search history.

(56) References Cited

U.S. PATENT DOCUMENTS 11,615,092 B1 * 3/2023 Breß ............... G06F 9/4881
                                                707/718
2010/0318963 A1 * 12/2010 Kajiya ............. G06F 8/30
                                                717/119

FOREIGN PATENT DOCUMENTS

WO    2014062637 A2    4/2014

OTHER PUBLICATIONS

Aguilar-Saborit, et al., "POLARIS: The Distributed SQL Engine in Azure Synapse", In Proceedings of the VLDB Endowment, vol. 13, Issue 12, Jul. 31, 2020, pp. 3204-3216.
(Continued)

*Primary Examiner* — Van H Oberly
(74) *Attorney, Agent, or Firm* — Weaver IP L.L.C.

(57) ABSTRACT

A hypergraph workload manager in a server is configured for failure tolerant and explainable state machine driven hypergraph execution. The hypergraph executor comprises a query optimizer, a hypergraph enlister, a pipeline analyzer, and a state machine generator. The query optimizer translates a user query into a query operator graph. The hypergraph enlister enlists the query operator graph into a hypergraph containing a set of query operator graphs representative of already submitted user queries. The enlistment is configured to join query operator graphs where it makes sense to optimize query executions. Updates to the hypergraph based on the enlistment results in a set of disconnected graphs. The pipeline analyzer performs an analysis of all operators of all queries in the hypergraph to find an optimal sequencing of execution. The state machine generator is configured to generate a hierarchical state
(Continued)

machine for all operators of a disconnected graph of the hypergraph.

20 Claims, 9 Drawing Sheets

(56) References Cited

OTHER PUBLICATIONS

International Search Report and Written Opinion received for PCT Application No. PCT/US2024/030141, Aug. 26, 2024, 13 pages.

* cited by examiner

FAILURE TOLERANT AND EXPLAINABLE STATE MACHINE DRIVEN HYPERGRAPH EXECUTION

CROSS-REFERENCE TO RELATED APPLICATIONS

This application claims priority to U.S. Provisional Patent Application Ser. No. 63/503,643, filed May 22, 2023, and titled "FAILURE TOLERANT AND EXPLAINABLE STATE MACHINE DRIVEN HYPERGRAPH EXECUTION," the entirety of which is incorporated by reference herein.

BACKGROUND

"Cloud computing" refers to the on-demand availability of computer system resources (e.g., applications, services, processors, storage devices, file systems, and databases) over the Internet and data stored in cloud storage. Servers hosting cloud-based resources may be referred to as "cloud-based servers" (or "cloud servers"). A "cloud computing service" refers to an administrative service (implemented in hardware that executes in software and/or firmware) that manages a set of cloud computing computer system resources.

Cloud computing platforms include quantities of cloud servers, cloud storage, and further cloud computing resources that are managed by a cloud computing service. Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. One of the pillars of cloud services are compute resources, which are used to execute code, run applications, and/or run workloads in a cloud computing platform. Such compute resources may be made available to users in sets, also referred to as "clusters."

Cloud data warehouses and big data analytics services use compute clusters to scale out the execution of complicated analytical queries that process massive amounts of data. The data may be stored in a cloud storage service like Microsoft Azure® Data Lake™. The compute nodes in modern clusters come equipped with high performance SSD (solid state drive) storage in addition to a decent amount of memory. The SSDs and memory across the compute nodes form the local caching tier of the warehouse. Data may be cached locally, both in memory and on disk, to optimize query performance. There may be an optional intermediate data tier between remote storage and the local SSD storage of the compute nodes. However, cache hits against the local caching layer offer the best performance.

Auto scaling is a technique in modern cloud data warehouses that dynamically grows and shrinks the size of a compute cluster based on workload demand. As the resource demand grows with more queries submitted to the system, more nodes are added to the cluster automatically and query processing adapts to take advantage of newer nodes. As demand goes down, nodes are removed from the compute cluster to reduce operational costs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hypergraph workload manager in a server is configured for failure tolerant and explainable state machine driven hypergraph execution. The hypergraph executor comprises a query optimizer, a hypergraph enlister, a pipeline analyzer, and a state machine generator. The query optimizer translates a user query into a query operator graph. The hypergraph enlister enlists the query operator graph into a hypergraph containing a set of query operator graphs that are representative of user queries already submitted to the hypergraph workload manager. The enlistment is configured to join query operator graphs where it makes sense to optimize query executions. Updates to the hypergraph based on the enlistment results in a set of disconnected graphs. The pipeline analyzer performs the analysis of all operators that can be scheduled for all disconnected graphs in hypergraph to find an optimal sequencing of execution. The state machine generator is configured to generate a hierarchical state machine for all operators of a disconnected graph of the hypergraph.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
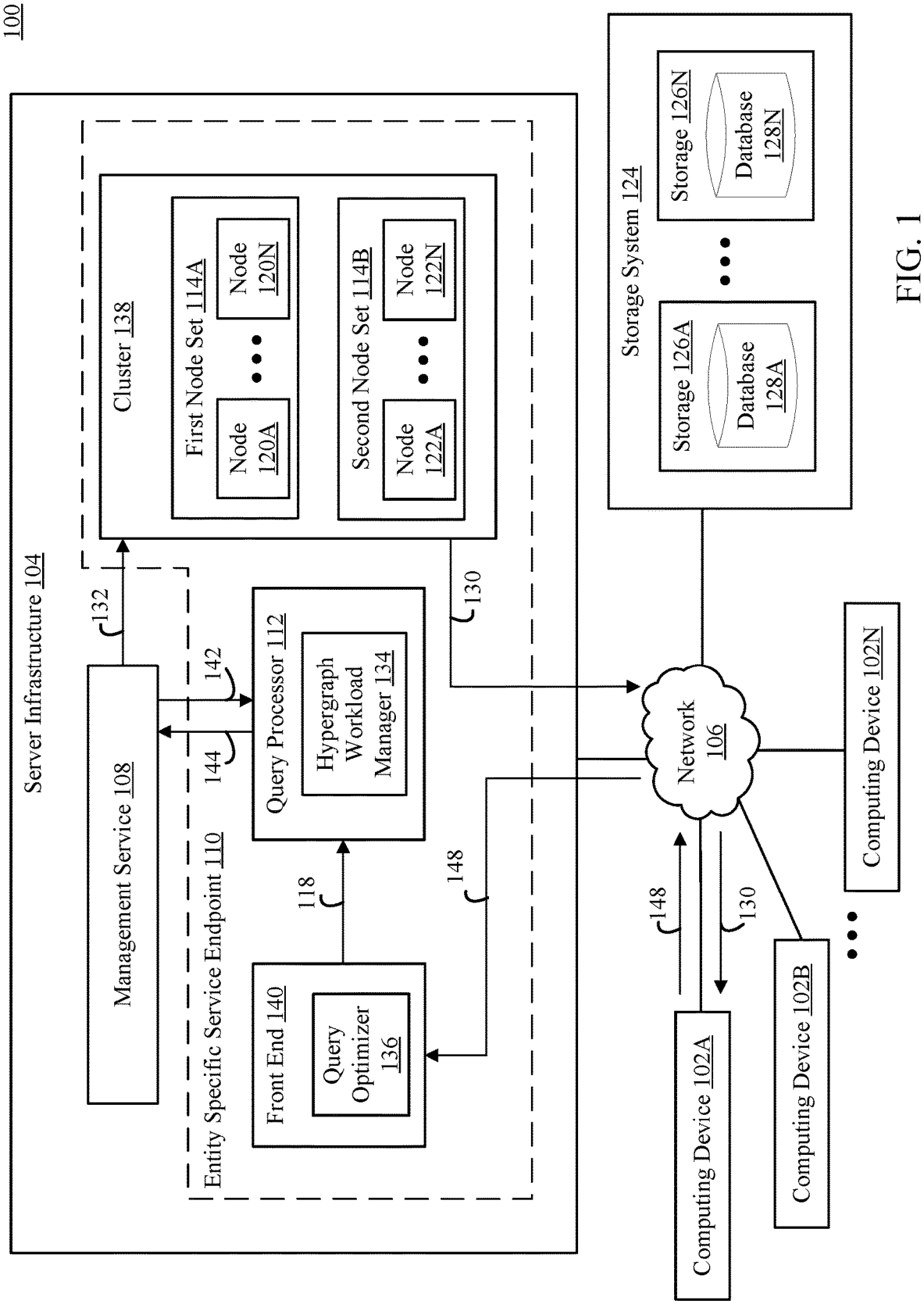
FIG. 1 shows a block diagram of a system for execution of queries through the implementation of a hypergraph, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Users are shifting away from locally maintaining applications, services, and data and migrating to cloud computing platforms. Cloud computing platforms offer higher efficiency, greater flexibility, lower costs, and better performance for applications and services relative to "on-premises" servers and storage. Cloud-computing platforms utilize compute resources to execute code, run applications, and/or run workloads. Examples of such compute resources include, but are not limited to, virtual machines, virtual machine scale sets, clusters (e.g., Kubernetes clusters), machine learning (ML) workspaces (e.g., a group of compute intensive virtual machines for training machine learning models and/or performing other graphics processing intensive tasks), serverless functions, and/or other compute resources of cloud computing platforms. A "cluster" (also referred to herein as a "compute cluster") is a set of compute nodes (computing devices such as computers and servers with one or more processors, storage, and cache memory). A cluster or node set may comprise a set of compute nodes or sets of compute nodes of any number. A "user" may be a user account, a subscription, a tenant, or another entity that is provided services of a cloud computing platform by a cloud service provider. These clusters and other resources are used by users (e.g., customers) to run code, applications, and workloads in cloud environments. Customers pay for the resources of a computing platform that they consume.

Cloud data warehouses and big data analytics services use compute clusters to scale out the execution of complicated analytical queries that process massive amounts of data. The data may be stored in a cloud storage service like Microsoft Azure® Data Lake™. The compute nodes in modern clusters come equipped with high performance SSD (solid state drive) storage in addition to significant memory. The SSDs and memory across the compute nodes form the local caching tier of the warehouse. Data may be cached locally, both in memory and on disk, to optimize query performance. There may be an optional intermediate data tier between remote storage and the local SSD storage of the compute nodes. However, cache hits against the local caching layer offer the best performance.

A workload may include multiple user queries for processing in a batch against a database. Such batches may include any number of queries, including hundreds or thousands of queries, or even greater numbers, that are applied to massive databases, including databases at petabyte scale. As such, query processing systems are needed that are capable of handling multi-query workloads applied to very large scale databases. Furthermore, predictable performance at scale is desired that is fault tolerant amid varying workloads.

Embodiments enable the handling of large and varying user query workloads against a database by directed acyclic graph (DAG) execution that provides advantages, such as ensuring, regardless of complexity of varying workloads, a low memory footprint execution, providing a failure tolerant execution engine, and providing an explainable and re-playable execution model.

In embodiments, a query optimizer processes an incoming query to produce an optimal plan which is structured as a dependency graph (a Directed Acyclic Graph, or "DAG") referred to herein as a "query graph" or "query operator graph." Each vertex of the query graph is a distributed operator (or "operator") that comes with an estimated resource demand expressed as a 3-dimensional vector consisting of a CPU (central processing unit) cost (number of cores), a memory cost, and a disk cost. Each operator may also include a parallelism attribute or property (also referred to as a Distributed Degree of Partitioned Parallelism (DOPP)) the indicates a number of compute nodes the execution of the operator can be parallelized on. The operators connected by an edge in the query graph share a producer-consumer relationship with a dependency constraint. When a producer operator (child or dependency) executes/runs, it removes a dependency constraint for all its consumer parents. A consumer parent is free to run when all its producer children have completed execution. A consumer operator processes the results generated by all its children and, in doing so, produces information for the consumption of its own parent. The root operator is the final parent operator in the query graph and produces a final result set. The leaves of the query graph (outermost operators) are frequently scan operators without any children and they read data from remote storage, though in some cases can be other operator types. An operator can be seen as a task requiring instantiation across one or more nodes for executing the operator. Each instance of the task processes a partition of the input dataset. The workload, composed of 'N' user queries, is represented as a hyper workload graph—a hypergraph—which combines all query graphs (of the individual user queries) into a single large collection of tasks.

The DAGs of all active queries collectively form the hypergraph. Each individual DAG for a user query can be initially seen as a disconnected graph (also referred to herein as an "independent query graph" or "independent graph"). The hypergraph is a global DAG composed of a set of the disconnected query graphs. The hypergraph concept provides several advantages together with the execution model based on hierarchical state machines described in the subsequent sections.

For instance, a hypergraph enables common subexpression elimination. Common subexpressions include shared operators and/or shared workload tasks. The DAGs allow us to detect common query subexpressions, or common execution paths between two or more disconnected graphs and unify them to form a single connected graph in the hypergraph. Different query DAGs that form a connected graph share one or more common subtrees (that include one or more subexpression) of execution. The impact of this is the ability to reap the advantages of single execution reuse—the common subtree is evaluated once across the unified graphs, versus multiple times across multiple independent graphs. The detection of common paths between disconnected graphs is performed using distinct query operator signatures. The ability to join the query graphs while the queries are running is possible because of the execution intent captured by the execution state machine disclosed herein. With common subexpression optimization, each disconnected graph in the hypergraph could be a connected graph of multiple query DAGs.

These and further embodiments are described with respect to FIG. 1. FIG. 1 shows a block diagram of a system 100 for query execution, in accordance with an embodiment. As shown in FIG. 1, system 100 includes computing devices 102A-102N, a server infrastructure 104, and a storage system 124. Server infrastructure 104 includes a management service 108, a query processor 112, a front end 140, and a cluster 138. Front end 140 includes a query optimizer 136. Query processor 112 includes a hypergraph workload manager 134. Cluster 138 includes a first node set 114A and a second node set 114B. First node set 114A includes nodes 120A-120N and second node set 114A includes nodes 122A-122N. Storage system 124 includes storage 126A-126N that each include a respective one of databases 128A-128N. In server infrastructure 104, an entity specific service endpoint 110 is present that includes front end 140, query processor 112, and cluster 138. Computing devices 102A-102N, server infrastructure 104, and storage system 124 are each communicatively coupled to each other via a network 106. System 100 is described in further detail as follows.

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Computing devices 102A-102N each store data and execute computer programs, applications, and/or services. Network 106 may comprise one or more networks such as local area networks (LANs), wide area networks (WANs), enterprise networks, the Internet, etc., and may include one or more wired and/or wireless portions.

Storage system 124 may include one or a plurality of network-accessible servers (e.g., in a cloud-based environment or platform) that manage access to storage 126A-126N. In an embodiment, storage system 124 is a distributed storage service in which data may be stored across multiple computing nodes. Storage 126A-126N may comprise any suitable storage types, including hard disk drives, solid state drives, and/or other types of storage described elsewhere herein or otherwise known. Storage system 124 may comprise any number of databases 128A-128N of one or more structures, such as a relational database, a distributed relational database, a data lake, etc., and may include one or more database management systems to manage access to data of the databases.

Server infrastructure 104 may be a network-accessible server set (e.g., a cloud-based environment or platform). Management service 108 is configured to manage the distribution of resources of server infrastructure 104 to users (e.g., individual users, tenants, customers, and other entities) at computing devices 102A-102N. Management service 108 may be incorporated as a service executing on a computing device of server infrastructure 104. For instance, management service 108 (or a subservice thereof) may be configured to execute on one or more compute nodes of server infrastructure similar to nodes 120A-120N and 122A-122N. As shown in FIG. 1, server infrastructure 104 includes a single management service 108. It is also contemplated herein that a server infrastructure may include multiple management services. An example of management service 108 includes, but is not limited to, Azure® Resource Manager™ owned by Microsoft® Corporation, although this is only an example and is not intended to be limiting.

Cluster 138 is a compute cluster (or "computer cluster") that includes compute nodes and is configured to perform computational workloads by request. Server infrastructure 104 may include more than one cluster 138, with each cluster comprising any number of nodes, node sets, and/or additional clusters. Furthermore, cluster 138 may include one or more node sets, such as first and second node sets 114A and 114B. Nodes 120A-120N and 122A-122N may each comprise one or more server computers, server systems, and/or computing devices. Each of nodes 120A-120N, and 122A-122N may be configured to execute one or more software applications (or "applications") and/or services and/or manage hardware resources (e.g., processors, memory, etc.), which may be utilized by users (e.g., customers) of the network-accessible server set. Nodes 120A-120N and 122A-122N may also be configured for specific uses, including to execute virtual machines, machine learning workspaces, scale sets, databases, etc.

In an embodiment, cluster 138 may be implemented in a datacenter (e.g., housed in one or more nearby buildings with associated components such as backup power supplies, redundant data communications, environmental controls, etc.) or in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Query optimizer 136 is configured to process incoming queries (i.e., user query 148) received from computing devices 102A-102N, including producing a query plan to execute the query. For instance, query optimizer 136 may receive user query 148 submitted by computing device 102A and translate user query 148 into a query graph representation thereof, thereby generating a query graph 118. For each operator of each generated query graph, query optimizer 136 may be further configured to determine a parallelism attribute (i.e., DOPP) indicative of a quantity of compute nodes (e.g., nodes 120A-120N and 122A-122N) in which to execute the operator. Query optimizer 136 may mark the operators with their respective parallelism attribute in query graph 118.

In embodiments, query processor 112 is configured to manage received query graphs, such as query graph 118 (shown received by query processor 112 in FIG. 1), in a combined form referred to herein as a hypergraph, and to cause orderly execution of the hypergraph in cluster 138. Query processor 112 may also be enabled to request scaling of the nodes of cluster 138 according to the computational demand of the hypergraph. For instance, as shown in FIG. 1, query processor 112 may transmit a scaling request 144 to management service 108, which then instructs cluster 138 via scaling command 132 to increase or decrease compute nodes accordingly. When scaling up the number of nodes, server infrastructure 104 may instruct a resource pool (not shown in FIG. 1) to allocate additional compute nodes to cluster 138. When instructed by management service 108 to scale down the number of nodes, cluster 138 may return nodes back to the resource pool. Management service 108 may transmit a scaling confirmation 142 to query processor 112 to indicate that the scaling request has been completed and to indicate the quantity of nodes added to or removed from cluster 138.

In embodiments, hypergraph workload manager 134 performs hypergraph management related tasks for query processor 112. In particular, hypergraph workload manager 134 is configured to enlist received query graphs, such as query graph 118, into the hypergraph. Furthermore, hypergraph workload manager 134 is configured to generate a hierarchical state machine representative of the hypergraph, which may be used to order execution of the operators of the hypergraph in cluster 138, as well as being used to analyze and remedy execution failures of hypergraph operators in cluster 138.

As mentioned further above, an entity specific service endpoint 110 is present in server infrastructure 104 that includes front end 140, query processor 112, and cluster 138. Entity specific service endpoint 110 is associated with an entity, such as, but not limited to, a customer, a tenant, a company, a department, a group, a person, a user, and/or the like. Entity specific service endpoint 110 is configured to service queries for the entity. Any number of entity specific service endpoints 110 may be present within server infrastructure 104 to efficiently manage queries for corresponding entities.

Users associated with the entity are enabled to utilize entity specific endpoint 110 via computing devices 102A-102N. A user may be enabled to sign-up with a cloud services subscription with a service provider of the network-accessible server set (e.g., a cloud service provider). Upon signing up, the user may be given access to a portal of server infrastructure 104 (not shown in FIG. 1). The user may access the portal via one of computing devices 102A-102N, such as by using a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, a password, PIN, etc.)) prior to receiving access to the portal.

Upon receiving authentication, the user may utilize the portal to perform various productivity and/or cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); submitting queries (e.g., SQL queries) to databases of server infrastructure 104 such as databases 128A-128N; etc. Examples of compute resources of cluster 138 include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, etc. The portal may be configured in any manner, such as by any combination of text entry, for example, via a command line interface (CLI), one or more graphical user interface (GUI) controls, etc., to enable user interaction.

A user-provided query may be executed in entity specific service endpoint 110. For instance, user query 148 may be submitted by a user at computing device 102A, transmitted from computing device 102A over network 106, and received by front end 140 of entity specific service endpoint 110. User query 148 may be a query of any type, format, or syntax, such as a SQL (structured query language) query, that includes one or more expressions, predicates, statements, etc. Query optimizer 136 of front end 140 is configured to optimize user query 148 by creating a query graph of operators from user query 148, referred to as query graph 118 (or "query operator graph 118"). In an embodiment, query optimizer 136 generates query graph 118 as a set of vertices (representing operators) interconnected by edges (representing dependencies). Query optimizer 136 may also determine a parallelism attribute (i.e., DOPP) of each of the query operators and mark each operator according to its parallelism attribute in query graph 118. Query graph 118 is sent by front end 140 to query processor 112 for processing of query graph 118. Hypergraph workload manager 134 enlists query graph 118 into a hypergraph, and query processor 112 schedules execution of the generated hypergraph in cluster 138 to generate query result 130. Query result 130 is transmitted by cluster 138 over network 106 to computing device 102A as a response to user query 148.

Figure 2:
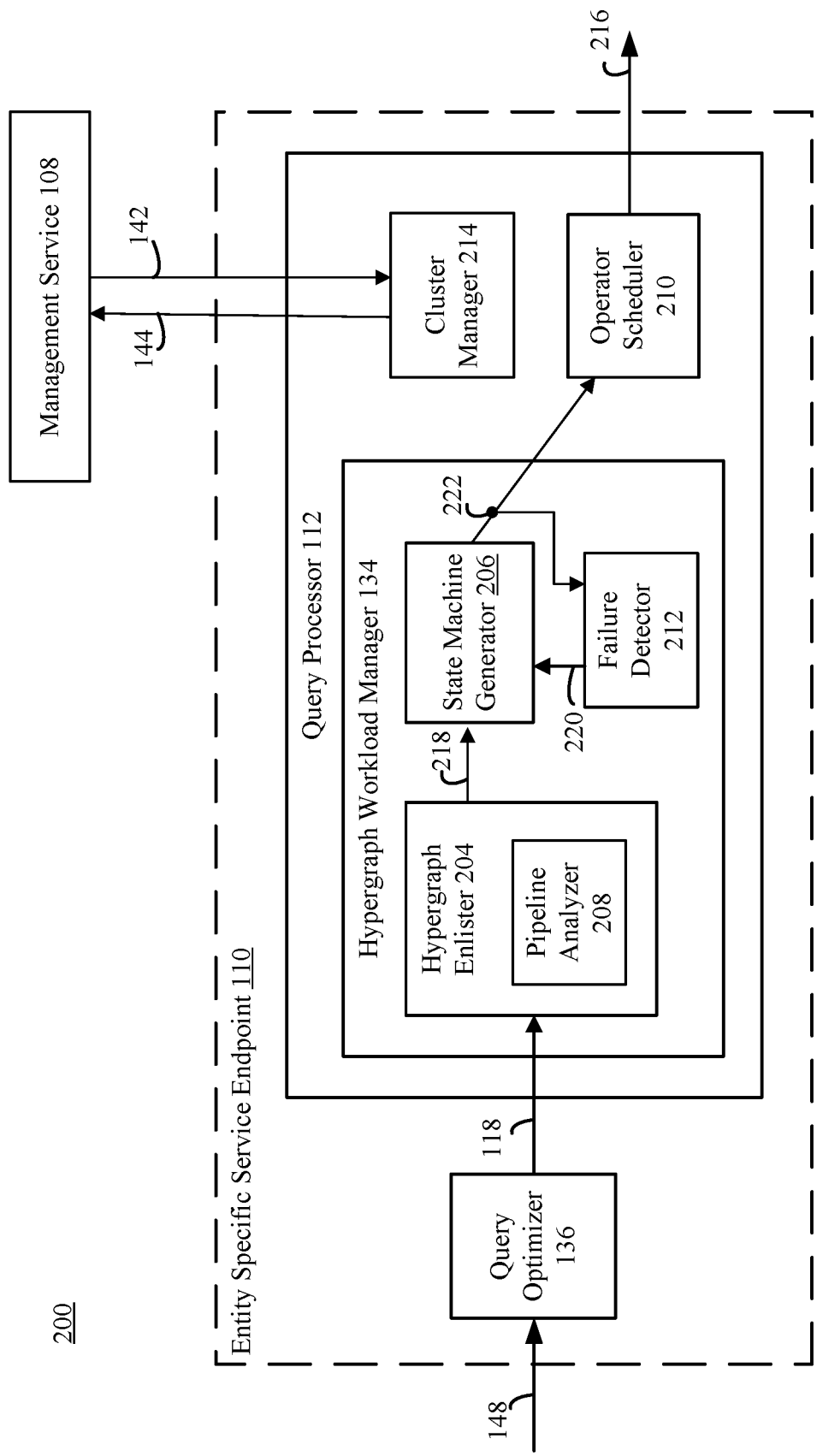
FIG. 2 shows a block diagram of a system for hypergraph processing, in accordance with an embodiment.
Figure 3:
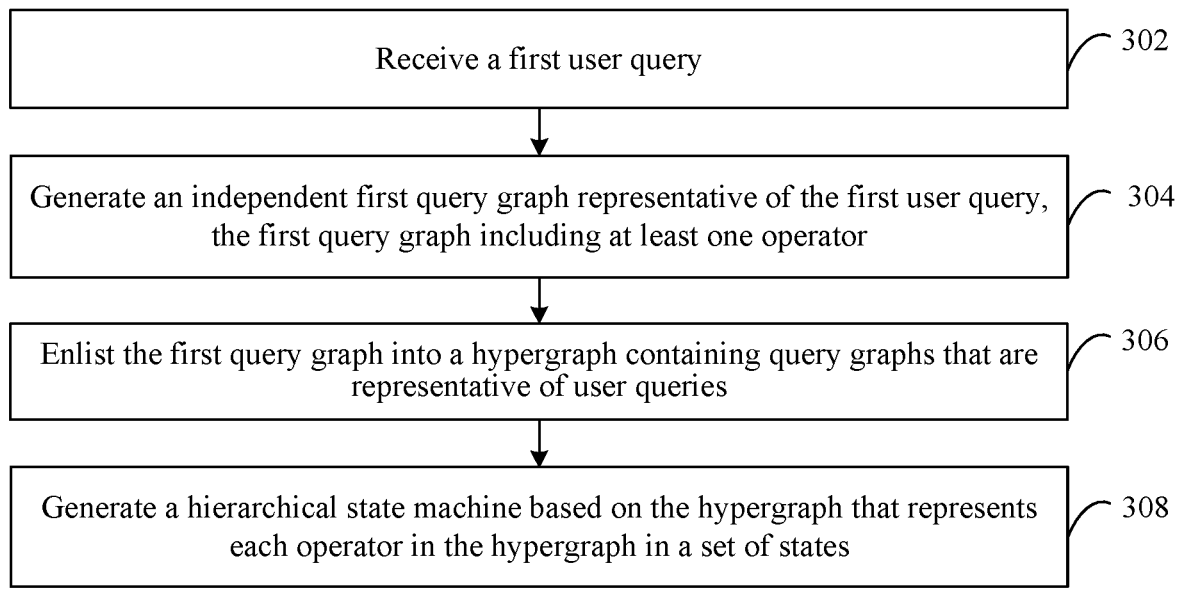
FIG. 3 shows a flowchart of a process for generating a hierarchical state machine representative of a hypergraph of queries, in accordance with an embodiment.

Entity specific service endpoint 110, including query processor 112 with hypergraph workload manager 134, may be configured and may operate in various ways to perform these functions. For example, FIG. 2 shows a block diagram of a system 200, which is a portion of server infrastructure 104 of FIG. 1 configured for hypergraph processing according to an embodiment. As shown in FIG. 2, system 200 includes entity specific service endpoint 110 and management service 108. Entity specific service endpoint 110 includes query optimizer 136 and query processor 112. Query processor 112 includes hypergraph workload manager 134, an operator scheduler 210, and a cluster manager 214. Furthermore, hypergraph workload manager 134 comprises a hypergraph enlister 204, a state machine generator 206, and a failure detector 212. Hypergraph workload manager 134 includes a pipeline analyzer 208. For illustrative purposes, system 200 is described below with respect to FIG. 3. FIG. 3 shows a flowchart 300 of a process for generating a hierarchical state machine representative of a hypergraph of queries, in accordance with an embodiment. Hypergraph workload manager 134 may operate according to flowchart 300 in embodiments. Note that not all steps of flowchart 300 need be performed in all embodiments. Further structural and operational embodiments will be apparent to persons skilled in the relevant art(s) based on the following description of FIG. 2 and FIG. 3.

Flowchart 300 begins with step 302. In step 302, a first user query is received. As shown in FIG. 2, query optimizer 136 receives user query 148. User query 148 may be a query directed to a database, such as one or more of databases 128A-128N of FIG. 1, and may have any suitable form, such as being structured as an SQL (Structured Query Language) query. Query optimizer 136 may receive any number of queries to form a multi-query workload.

In step 304, an independent first query graph representative of the first user query is generated, the first query graph including at least one operator. As shown in FIGS. 1 and 2, query optimizer 136 is configured to convert received user query 148 into a query graph (query operator graph) structured as a DAG (Directed Acyclic Graph) with dependency constraints. Each query graph generated by query optimizer 136 is a disconnected graph independent of other query graphs. Each vertex in the query graph is a distributed operator (or just operator) and encapsulates some work that must be performed by one or more compute nodes. Each edge in the graph represents a dependency constraint between a consumer operator (dependency) and a producer operator (dependent). Each operator processes the information produced by its children and creates new information to be consumed by its parent(s). Leaf operators, which are operators without any children, are frequently scan operators that read data from a remote source. Filters, local aggregates and other such computations may be pushed to scan operators to optimize performance. As shown in FIG. 2, query optimizer 136 outputs the generated query graph as query graph 118.

Note that the number of nodes over which a given operator can be spread for parallel execution is governed by the parallelism attribute or property of the operator. In an embodiment, query optimizer 136 determines the optimal parallelism attribute of each operator (e.g., based on a known property of specific operator types being parallelizable). Query optimizer 136 may indicate the parallelism attribute for each operator in query graph 118.

Referring back to flowchart 300, in step 306, the first query graph is enlisted into a hypergraph containing query graphs representative of user queries. As shown in FIG. 2, hypergraph enlister 204 receives query graph 118. Hypergraph enlister 204 is configured to generate and maintain a hypergraph 218 that includes multiple query graphs and to enlist newly received query graphs including query graph 118. In particular, hypergraph enlister 204 forms hypergraph 218 as a DAG that contains the DAGs of all active queries. As such, hypergraph 218 is a global DAG composed of a set of disconnected graphs and provides several advantages together with the execution model based on hierarchical state machines, as described in further detail as follows and elsewhere herein. In an embodiment, query graph 118 is integrated into hypergraph 218 by insertion of the operators of query graph 118, and their dependencies, into hypergraph 218 (e.g., into the table, array, or other data structure in which hypergraph 218 is maintained).

Note that the inclusion of query graph 118 into hypergraph 218 may leave query graph 118 independent of other query graphs of hypergraph 218 or may entail common subexpression elimination performed by hypergraph enlister 202 to combine/join query graph 118 with one or more other query graphs. Common subexpression elimination by hypergraph enlister 202 refers to the detection of common query subexpressions and/or common execution paths between two or more disconnected graphs of hypergraph 218, and their unification into a single connected graph in hypergraph 218. Common subexpression elimination that may be performed by hypergraph enlister 204 is described in further detail herein.

Referring back to flowchart 300, in step 308, a hierarchical state machine is generated based on the hypergraph that represents each operator in the hypergraph as a set of states. For example, as shown in FIG. 2, state machine generator 206 may receive hypergraph 218, and generate a hierarchical state machine 222 based thereon. Hierarchical state machine 222 is generated as a DAG execution model expressed as execution intents using state machines and a history tracker for each execution intent. The DAG representation of a query graph for a user query provides the precedence constraints where leaf tasks are executed first, followed by execution of their parent, and so on. The execution model of the hypergraph is captured in hierarchical state machine 222 by expressing an execution intent that follows the precedence order specified by the hypergraph DAG and a failure domain (or, scope) to reschedule portions of the hypergraph DAG effected by failure of a vertex (i.e., operator) in the DAG. This intent is captured via a compositional (or, composite) state machine. The non-leaf task execution may rely on the leaf task execution as a composite state composed of the leaf task execution templates it relies upon. Every vertex in the hypergraph DAG goes through a set of states through transitions that may include beginning with 'waiting to execute on dependencies' (awaiting on dependencies to complete), to 'ready to execute', to 'executing' (actual execution), and then eventual completion, where 'waiting to execute on dependencies' is captured as a composite state of dependencies' execution and the actual execution is again a composite state of parallel task execution based on a parallelism attribute for a corresponding operator. Thus, for a leaf operator with no dependencies, the only composite state would be actual execution, while an intermediate operator with leaf children may have two kinds of composite states-one awaiting on all dependencies to complete (leaves in this case) and another for the actual execution of the operator (as paralleled according to the indicated parallelism attribute). Therefore, the entire DAG execution model may be visualized prior to execution as a hierarchical state machine in hierarchical state machine 222.

Figure 4:
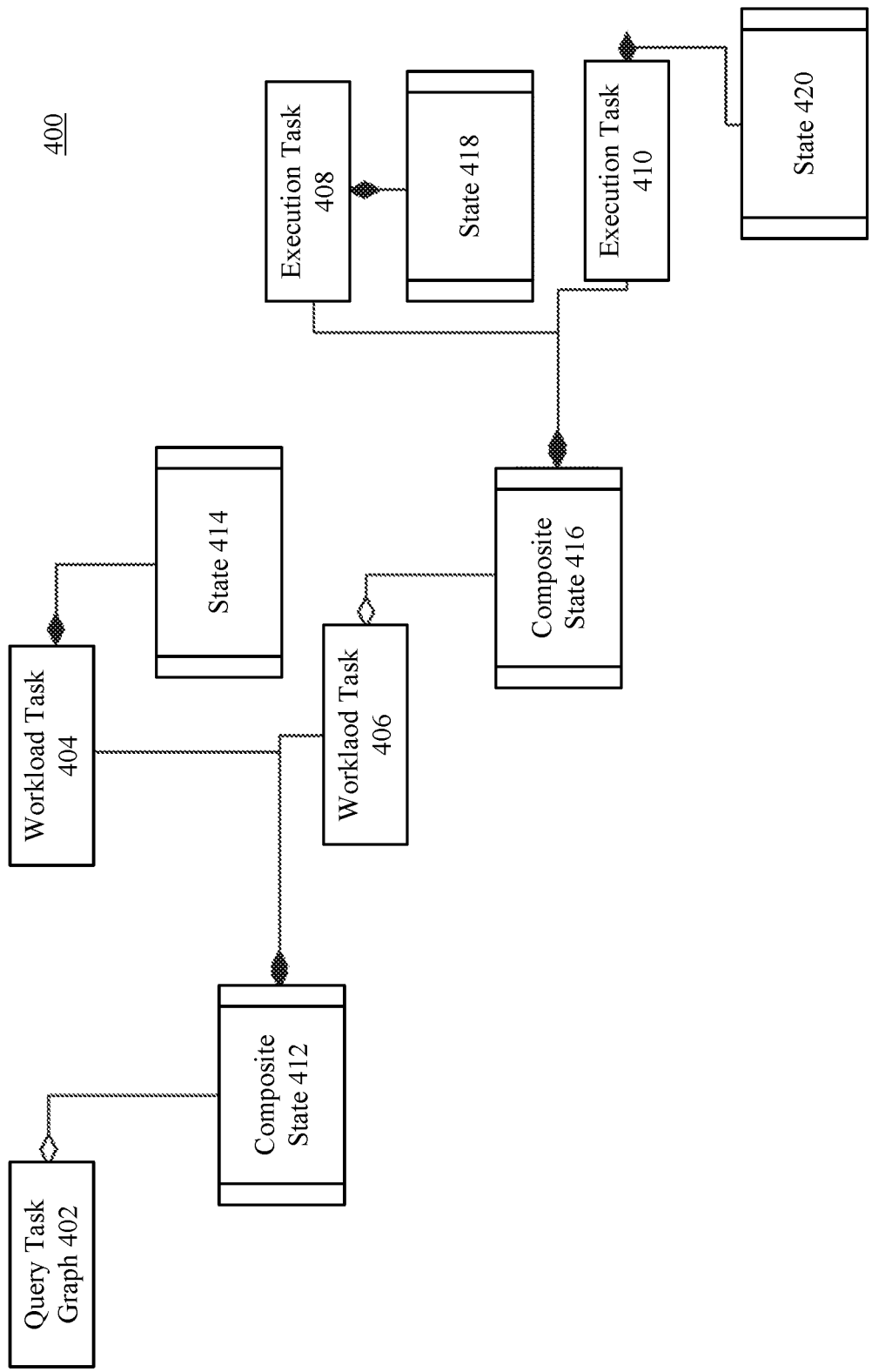
FIG. 4 illustrates a hierarchical state machine, in accordance with an embodiment.

Hierarchical state machine 222 may have any suitable structure of states and dependencies, depending on the construction of the hypergraph being represented in state machine form. For instance, FIG. 4 graphically illustrates a hierarchical state machine 400 comprising states for each workload task of a query, in accordance with an embodiment. Hierarchical state machine 400 is an example of hierarchical state machine 222. In hierarchical state machine 400, each query operator of the represented hypergraph is represented as a workload task, and each workload task maps to one or more execution tasks (corresponding to the degree of parallelism). In the example of FIG. 4, hierarchical state machine 400 includes a query task graph 402 of a single query (for simplicity) that includes first and second operators represented as a first workload task 404 and a second workload task 406, respectively. Second workload task 406 is mapped into a first execution task 408 and a second execution task 410 (e.g., due to a parallelism attribute of two). Furthermore, query task graph 402 has an associated composite state 412, workload task 404 has an associated state 414, second workload task 406 has an associated composite state 416, execution task 408 has an associated state 418, and execution task 410 has an associated state 420.

In FIG. 4, query task graph 402, first workload task 404, second workload task 406, first execution task 408, and second execution task 410 are each referred to as an "entity." A "state" represents a discrete, continuous segment of time wherein the associated entity's behavior will be stable. The entity will stay in a state until it is stimulated to change by an event. An "event" is instant in time that may be significant to the behavior of entity. Events are commands or requests from other objects, or anything else significant happening in the hierarchical state machine below or above. A "transition" refers to the movement of an entity from one state to another based on behavior change. A transition is effected by an outside event or internal change in the entity and shows a valid progression in state. A "composite state", such as composite states 412 and 416, is a state that includes a state machine of another entity. Generally, composite states are intermediate states where activity is going on. An entity in the composite state may have dependency on activities of one or more other entities, referred to as dependent entities. The collective state of these dependent entities reflects the composite state of the entity. In hierarchical state machine 400, execution tasks 408 and 410 are dependent entities for workload task 406, and workload tasks 404 and 406 are dependent entities for query task graph 402.

During execution of hypergraph 218, each state in hierarchical state machine 222 may have a corresponding state value of a variety of possible state values. In one example, each state may have one of the following state values: blocked, unblocked, execution failed, execution cancelled, ready to execute, waiting for execution, execution in progress ("executing"), or execution completed. In other embodiments, other state values may be possible.

As such, at any given time during execution of hierarchical state machine 400, the entities of hierarchical state machine 400 may have various corresponding states. For instance, in one example, hierarchical state machine 400 may be in the middle of execution, resulting the following state values for its entities: states 418 and 420 are execution completed, composite state 416 is execution in progress (due to being enabled to execute by execution tasks 408 and 410 being having corresponding execution completed states), state 414 is execution completed, and composite state 412 is waiting for execution (due to waiting for dependent entity workload task 406 (which has a corresponding execution in progress state) to complete execution, while dependent entity workload task 404 has already completed execution). At other times, hierarchical state machine 400 may be at points of execution, and thus the entities within may have other commensurate state values.

Accordingly, as described above and represented in FIG. 4, state machine generator 206 of FIG. 2 may generate hierarchical state machines 222 and 400 in the form of workload tasks representing the operators of hypergraph 218, with each workload task potentially having a corresponding set of execution tasks, with each entity of hypergraph 218 having an associated state, and with the entities interconnected by directional dependencies. Hierarchical state machine 222 may be generated and stored in table, array, or other suitable form to indicate these entities and their corresponding states and dependencies. Note that hierarchical state machine 400 of FIG. 4 is shown for illustrative purposes, and in further examples, hierarchical state machine 400 may include further numbers of tasks with corresponding dependencies arranged in any configuration. Hierarchical state machine 400 may be generated for any size hypergraph containing any number of query graphs, including query graphs for tens, hundreds, thousands, or even greater numbers of queries.

Referring to FIG. 2, after completion of flowchart 300 of FIG. 3, operator scheduler 210 may receive hierarchical state machine 222 and generate operator schedule 216 based thereon. Operator schedule 210 may generate operator schedule 216 to schedule one or more operators of hypergraph for execution in cluster 138 of FIG. 1. The operators are scheduled for execution in cluster 138 in the form of workload task and execution tasks of hierarchical state machine 222 in nodes of cluster 138, and in an order of execution dictated by hierarchical state machine 222. For instance, one or more tasks of leaf operators may be first executed. After the dependent entities of a parent entity are executed, the parent entity becomes unblocked and can then be executed. Cluster 138 receives operator schedule 210 and execution of the indicated tasks is caused to be performed in the designated nodes of first and second node sets 114A and/or 114B. The states indicated in hierarchical state machine 222 may be updated as tasks go through their various states, such as progressing from "ready to execute" to "execution in progress" to "execution completed," and/or from "blocked" to "unblocked," etc.

When a root operator of a query graph of hypergraph 218 has completed execution of all tasks (e.g., the root operator has a state of execution completed) in cluster 138, the results of the execution of that root operators may be returned as query result 130 for the corresponding query graph 118 to the user in response to user query 148. Hypergraph enlister 218 may subsequently regenerate hypergraph 218 to be exclusive of operators of user graph 118 corresponding to that particular user query 148.

Cluster manager 214 of FIG. 2 may be present scale compute nodes of cluster 138 as needed. In particular, auto scaling is a technique used in modern cloud data warehouses to dynamically grow and shrink the size of a compute cluster based on workload demand. Cluster manager 214 of FIG. 2 may be configured to scale compute nodes of cluster 138 in any suitable manner, including removing compute nodes from and adding compute nodes to cluster 138, based on demand indicated by hierarchical state machine 222. For instance, cluster manager 214 may determine a number of compute nodes required for cluster 138 to execute the operators of hypergraph 218, including a set of one or more operators newly added to hypergraph 218. The number of compute nodes may be increased to accommodate executing a computationally intensive operator or a cache intensive operator. Subsequently, the number of compute nodes may be decreased after completing the execution of the operator. For instance, cluster manager 214 may request an increase or decrease in the number of compute nodes allocated to cluster 138 by transmitting scaling request 144 to management service 108. Management service 108 performs the requested scaling and transmits a confirmation of the executed request to cluster manager 214 in scaling confirmation 142.

In this manner, cluster manager 214 ensures that resources of server infrastructure 104 are efficiently used by requesting nodes to be allocated to cluster 138 when workload demands it, while having nodes reclaimed from cluster 138 when workload does not need them, such that these resources may be allocated elsewhere (e.g., to a cluster of a different entity specific service endpoint 110). This also enables the user of the current entity specific service endpoint 110 to avoid being charged for the unused compute nodes.

Note that cluster manager 214 may update a maintained data structure (e.g., a table, a list, an array) that tracks nodes in cluster 138 allocated to entity specific service endpoint 110. The data structure may include various information regarding the compute nodes of cluster 138, including indications of which types of node sets (e.g., cache intensive, compute intensive, etc.) are present in cluster 138, which compute nodes of cluster 138 are assigned to each node set, the compute node(s) of cluster 138 to which each operator of hierarchical state machine 222 are assigned, etc. The data structure may maintain, for each node, a unique node identification (ID), a unique node name, the assigned node set, etc. This data structure maintained by cluster manager 214 may be accessed by operator scheduler 210 for the purpose of scheduling operators/tasks for execution in specific nodes (e.g., nodes with processing/storage/memory availability).

In an embodiment, cluster manager 214 may compute composite demands (or workload demands) based on hierarchical state machine 222. The computed demand may be used to determine how much to grow and/or shrink cluster 138. Cluster manager 214 may also dynamically track progress for hierarchical state machine 222 and in doing so, manage the dependencies among each operator. Cluster manager 214 may inform operator scheduler 210 when operators are ready to execute. Multiple new operators may be unblocked around the same time, as determined by cluster manager 214, so operator scheduler 210 may be notified accordingly to schedule the ready operators for execution. In an embodiment, cluster manager 214 may track the state of each operator of hierarchical state machine 222, and throughout execution of query 148, update states of hierarchical state machine 222 according to new determined states of each operator/task.

As described above, hypergraph enlister 204 forms hypergraph 218 as a directed acyclic graph that contains directed acyclic graphs of all active queries, including query graph 118 formed from user query 148. The inclusion of query graph 118 into hypergraph 218 may leave query graph 118 independent of other query graphs of hypergraph 218 or may entail the joining of query graph 118 with other query graph by common subexpression elimination. The directed acyclic graph aspect of query graphs enables the detection by hypergraph enlister 204 of common query subexpressions, or common execution paths between two or more disconnected graphs, and the unifying of them into a single connected graph. An example of a common subexpression includes one or more shared operators. Different query graphs that form a connected graph share one or more subtrees (that include one or more subexpression) of execution. The impact of unifying separate query graphs is the ability to reap the advantages of single execution reuse—the common subtree is evaluated once across query graphs. The detection of common paths between disconnected graphs may be performed by hypergraph enlister 204 using distinct query operator signatures. The ability to join the query graphs while the queries are running is also possible because of the execution intent captured by the execution state machine of hierarchical state machine 222. With common subexpression optimization, each disconnected graph in a hypergraph may become part of a connected graph of multiple query graphs. As such, hypergraph enlister 204 may determine instances of a subexpression common to query graph 118 and an existing hypergraph, and as result, connect query graph 118 and the existing hypergraph to share the same instance of the subexpression.

Figure 5:
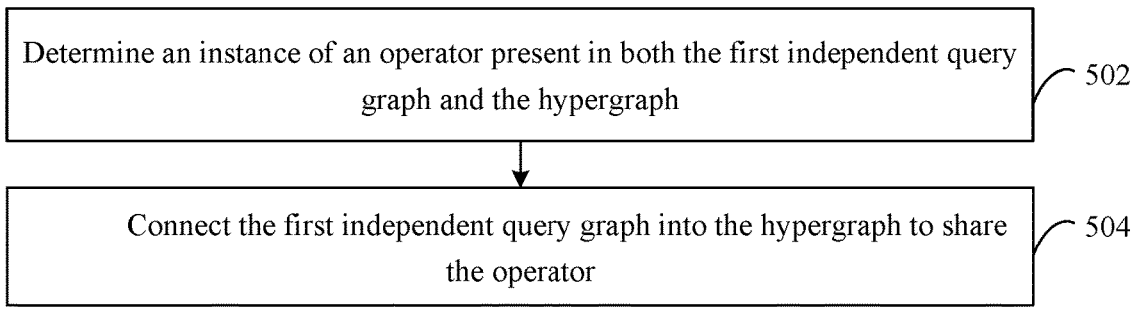
FIG. 5 shows a flowchart of a process for a more efficient hypergraph through combination of common operators, in accordance with an embodiment.

FIG. 5 is described as follows to illustrate an example of common subexpression elimination. In particular, FIG. 5 shows a flowchart 500 of a process for common subexpression elimination in a hypergraph, in accordance with an embodiment. Hypergraph enlister 204 may operate according to flowchart 500 in embodiments. Further structural and operational embodiments will be apparent to persons skilled in the relevant art(s) based on the following description of FIG. 5.

Figure 6:
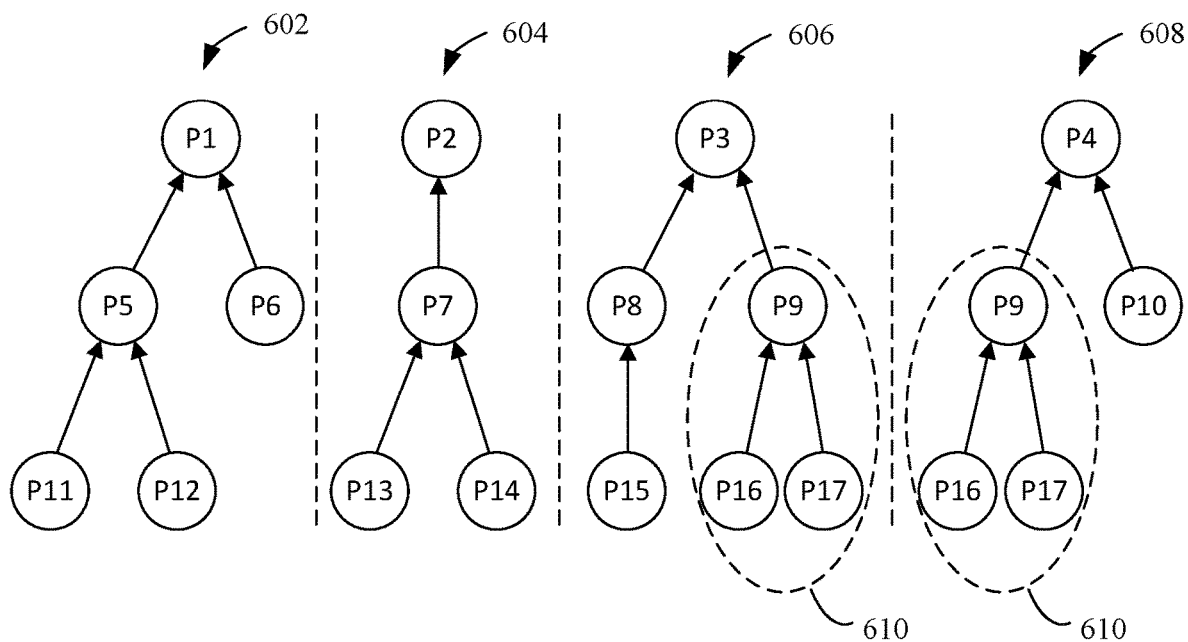
FIG. 6 illustrates independent query graphs with common operators, according to an example embodiment.
Figure 7:
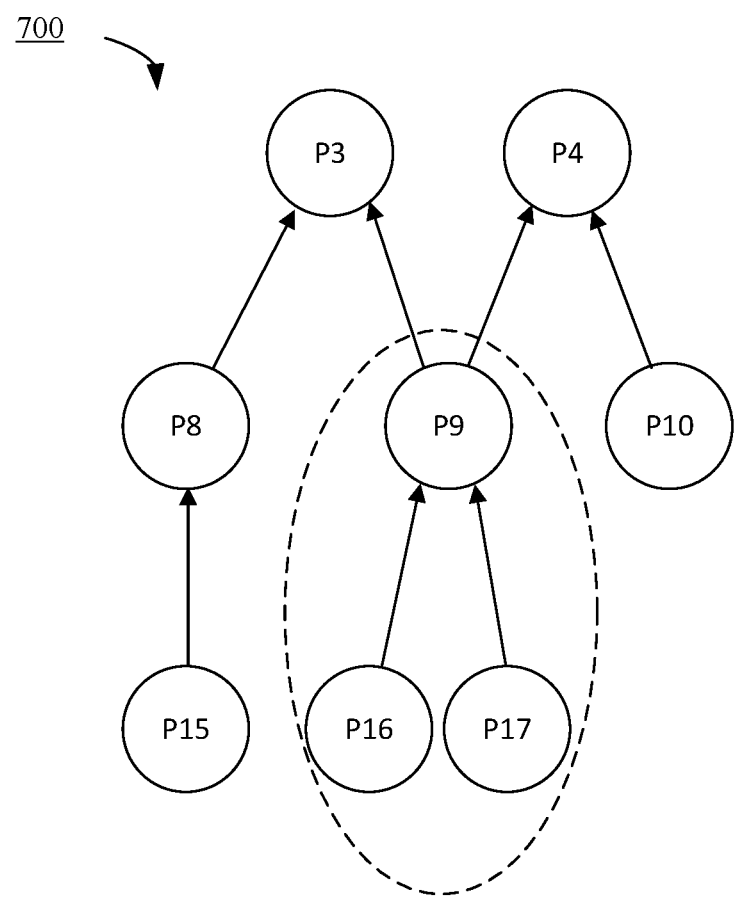
FIG. 7 illustrates a connected query graph with common operators combined, according to an example embodiment.

For illustrative purposes, FIG. 5 is described as follows with reference to FIGS. 6 and 7. FIG. 6 graphically illustrates a hypergraph 600 that is an example of hypergraph 218 of FIG. 2. Hypergraph 600 includes first through fourth query graphs 602-608, according to an example embodiment. Query graph 608 is a new query graph received by hypergraph enlister 204 that is being enlisted into hypergraph 600. Query graph 602 includes operators P1, P5, P6, P11, and P12, query graph 604 includes operators P2, P7, P13, and P14, query graph 606 includes operators P3, P8, P9, P15, P16, and P17, and query graph 608 includes operators P4, P9, P10, P16, and P17. Operators P1-P17 are each unique and are interconnected by directional dependencies (shown as arrows in FIG. 6) in their respective query graphs. Operators P11-P17 are leaf operators, operators P5-P10 are intermediate operators, and operators P1-P4 are root operators. Query graphs 602-608 are directional acyclic graphs because the directional dependencies form no loops, with all processed operator outputs proceeding toward their respective root operators.

Flowchart 500 begins with step 502. In step 502, an instance of an operator present in both the first query graph and the hypergraph, is determined. In the example of FIG. 6, hypergraph enlister 204 of FIG. 2 may analyze hypergraph 600 to determine whether any common subexpressions, such as a common operator, are present in the independent query graphs included within, including query graphs 602-608. Hypergraph enlister 204 may perform the analysis directly on hypergraph 600 (containing independent query graphs) or based upon hierarchical state machine 222. For instance, hypergraph enlister 204 may compare a signature for each operator of operators P1-P17 to signatures of the other operators to determine any matches. A signature of an operator may include, for example, an identifier for the operator combined with an identification of any parameters referenced by the operator, and may be based on the representation of an operator in hypergraph 600 or in hierarchical state machine 222 (as a collection of tasks and states). As illustrated in FIG. 6, query graphs 606 and 608 are identified by hypergraph enlister 204 (which identifies common subexpressions at the operator level) as sharing operators P9, P16, and P17. Operators P9, P16, and P17 are identified as a common subtree 610 of query graphs 606 and 608 due to the comparison resulting in matches for these common operators and their interdependencies.

In step 504, the first query graph is connected into the hypergraph to share the operator. In an embodiment, hypergraph enlister 204 of FIG. 2 connects query graph 608 into hypergraph 600. Due to the common operators forming common subtree 610 shown in FIG. 6, query graph 608 may be connected into hypergraph 600 by unifying query graph 608 with query graph 606 at common subtree 610. For instance, FIG. 7 shows an example of a unified query graph 700 (of hypergraph 600 of FIG. 6) after connecting/unifying operators P9, P16, and P17 shared between query graphs 606 and 608. In particular, hypergraph enlister 204 performs deduplication of the execution tasks of operators P9, P16, and P17 of query graphs 606 and 608 to leave a single instance of the execution tasks of operators P9, P16, and P17 in newly formed unified query graph 700. By connecting query graphs 606 and 608 together into unified query graph 700, a new version of hypergraph 600 is generated by hypergraph enlister 204 that includes query graphs 602, 604, and unified query graph 700 (individual query graphs 602 and 604 are no longer present). Consolidating hypergraph 600 through common subexpression elimination reduces the number of operators needing to be separately executed in cluster 138 to generate query results, resulting in faster query execution, reduced overhead, reduced resource usage, and fewer resources needed for query execution.

As described elsewhere herein, hierarchical state machine 222 includes a directed acyclic graph execution model expressed as execution intents using state machines. The state machine driven execution intent combined with the hypergraph enables flexible ordering and reordering of the operator execution sequence. Accordingly, pipeline analyzer 208 of hypergraph enlister 204 is configured to analyze hypergraph 218 to determine a preferred sequence of execution of the operators of hypergraph 218, and to order the operators in that determined sequence in hypergraph 218. State machine generator 206 generates hierarchical state machine 222 so that the operators (e.g., workload tasks and execution tasks) of hypergraph 218 are ordered in hierarchical state machine 222 for execution according to the determined sequence. Operator scheduler 210 receives hierarchical state machine 222 and executes hypergraph 218 in cluster 138 according to the sequence ordered in hierarchical state machine 222.

In particular, pipeline analyzer 208 of hypergraph enlister 204 analyzes hypergraph 218 as a set of disconnected graphs, where each vertex in each graph is a query operator, to determine an execution sequence that is more efficient than others. With the ability to represent hypergraph 218 as hierarchical state machine 222, with its captured execution intent, an optimal sequence of operator execution may be determined by pipeline analyzer 208 as a selected execution sequence. This determination may be performed by pipeline analyzer 208 as often as desired, including at every step of query execution. Pipeline analyzer 208 may determine the selected execution sequence in various ways, including by projecting amounts of time to execute a plurality of execution sequences, and comparing the execution sequences to determine an execution sequence projected to take the least amount of time to execution, and selecting this determined execution sequence as the selected execution sequence.

Execution is driven by playing the execution intent captured in the state machine of hierarchical state machine 222. Pipeline analyzer 208 may separate execution intent from actual execution by pausing state machine state and communicating to operator scheduler 210 (via hierarchical state machine 222 generated by state machine generator 206 based on hypergraph 218) to schedule operators to execute on compute nodes. This provides the benefit of the execution model (and orchestration) being independent of the platform in which definitional intent is executed, as well as the benefit of reordering execution intent without violating precedence constraints.

Separating intents from actual execution and capturing intents in a hierarchical state machine may further benefit a primary hypergraph executor (e.g., query processor 112) configured to orchestrate the intents, tracked by a second hypergraph executor (e.g., a second query processor 112) configured to replay the orchestration intent of the primary (replaying the state machine). Thus, the hypergraph executors may always be in sync, and execution orchestration may be taken over by the second hypergraph executor if the primary hypergraph executor were to fail (e.g., as detected by failure detector 212, as described in more detail further below).

Accordingly, the hypergraph representation of the workload together with the execution intent captured as a state machine allows pipeline analyzer 208 to analyze the graph continuously to generate the selected execution sequence. More importantly, the selected execution sequence can be modified dynamically by pipeline analyzer 208 as queries enter and exit the system and also based on other execution metrics. Furthermore, common subexpressions, such as operators, can be identified across query graphs and merged by hypergraph enlister 204 to form a single connected graph. Thus, the common subtree may be evaluated just once, and query results are shared by all queries.

In an embodiment, pipeline analyzer 208 sequences operators that are considered ready to execute (i.e., unblocked operators). Pipeline analyzer 208 may determine information on compute nodes associated and/or assigned to particular operators of the selected execution sequence it sends to operator scheduler 210. Node data maintained by cluster manager 214, for example, may be read by pipeline analyzer 208 to determine the selected execution sequence. Furthermore, hierarchical state machine 222 may be communicated to pipeline analyzer 208 from state machine generator 206, letting pipeline analyzer 208 know the current and historical states of the operators. Pipeline analyzer 208 may use operator state information when determining the selected execution sequence.

Operator schedule 216 is transmitted to one or more compute nodes (e.g., nodes 120A-120N and/or nodes 122A-122N of FIG. 1) to execute the operators of hierarchical state machine 222 according to a schedule indicated in operator schedule 216. For instance, operator schedule 216 may be received by cluster 138 of FIG. 1 to execute the operators of hierarchical state machine 222 in their indicated compute nodes according to a schedule indicated in operator schedule 216. As described above, pipeline analyzer 208 may determine the selected execution sequence that is then used in operator schedule 216 for most efficient execution. As scan operators execute according to operator schedule 216 in compute nodes of cluster 138, they produce results directly in storage/memory of their parent compute nodes of cluster 138 for consumption. Each operator is executed by one or more compute nodes of the cluster (i.e., first node set 114A and second node set 114B of cluster 138) to which they are assigned. The number of compute nodes used to execute an operator may be determined by their corresponding parallelism attribute, where the operator is parallelized over the number of compute nodes indicated by their respective parallelism attribute.

Figure 8:
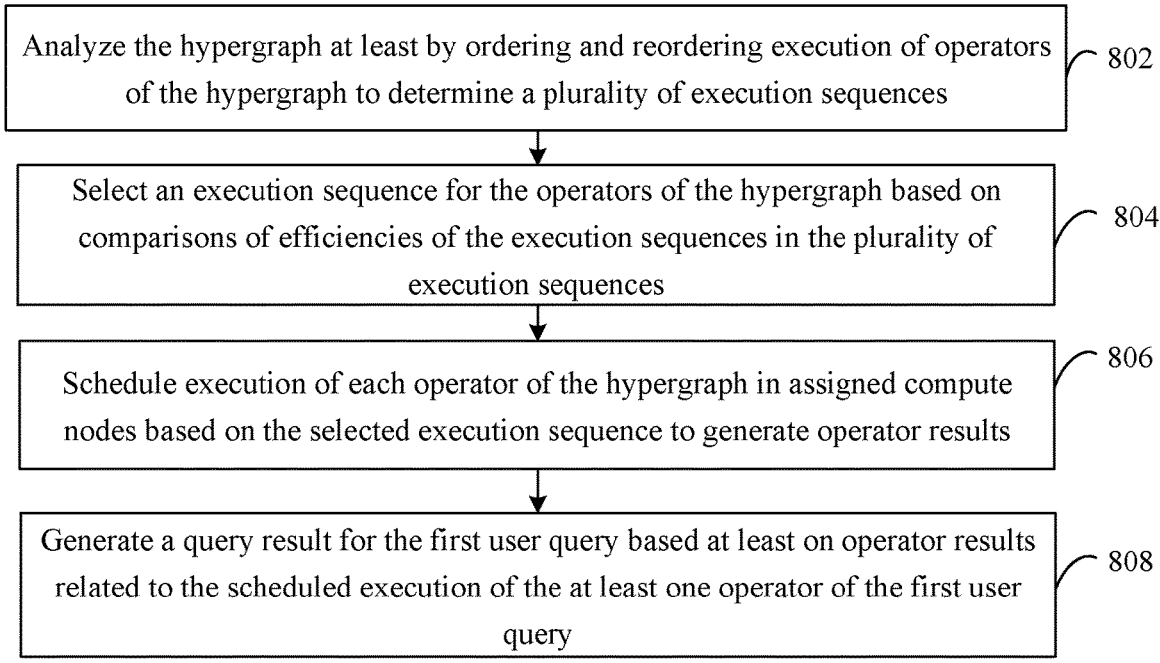
FIG. 8 shows a flowchart of a process for improving hypergraph efficiency to generate query results, in accordance with an embodiment.

These aspects of efficient execution sequence selection are further described with respect to FIG. 8. FIG. 8 shows a flowchart 800 of a process for generating a query result for a hypergraph, in accordance with an embodiment. Pipeline analyzer 208 and/or operator scheduler 210 may operate according to flowchart 800 in embodiments. Note that not all steps of flowchart 800 need be performed in all embodiments. Further structural and operational embodiments will be apparent to persons skilled in the relevant art(s) based on the following description of FIG. 8.

Flowchart 800 begins with step 802. In step 802, the hypergraph is analyzed at least by ordering and reordering execution of operators of the hypergraph to determine a plurality of execution sequences. As shown in FIG. 2 and described above, pipeline analyzer 208 analyzes hypergraph 218 by ordering and/or reordering operator execution sequences thereof to determine a plurality of operator execution sequences. Pipeline analyzer 208 may determine all or a portion of all possible operator execution sequences of hierarchical state machine 222 and their respective predicted execution durations.

In step 804, an execution sequence for the operators of the hypergraph is selected based on comparisons of efficiencies of the execution sequences in the plurality of execution sequences. In an embodiment, pipeline analyzer 208 may determine the selected execution sequence based on a comparison of the predicted durations of the execution sequences determined as described above. For instance, each task in hierarchical state machine 222 may have an expected duration (corresponding to the particular task) of execution, and the expected durations of the tasks may be combined for each execution sequence to determine an expected length of execution time for each execution sequence. Pipeline analyzer 208 may perform a comparative analysis to select the execution sequence of the determined execution sequences with the shortest execution time to be the selected execution sequence.

In step 806, execution of the operators of the hypergraph is scheduled in assigned compute nodes based on the selected execution sequence to generate operator results. In an embodiment, operator scheduler 210 generates operator schedule 216 to have an execution order for the operators of hypergraph 218 in cluster 138 according to the selected execution sequence.

In step 808, a query result is generated for the first user query based at least on operator results related to the scheduled execution of the at least one operator of the first user query. As described above, operators/tasks are caused to execute in cluster 138 according to operator schedule 216. Query result 130 is thereby generated in cluster 138, and subsequently transmitted to computing device 102A in response to user query 148.

Figure 9:
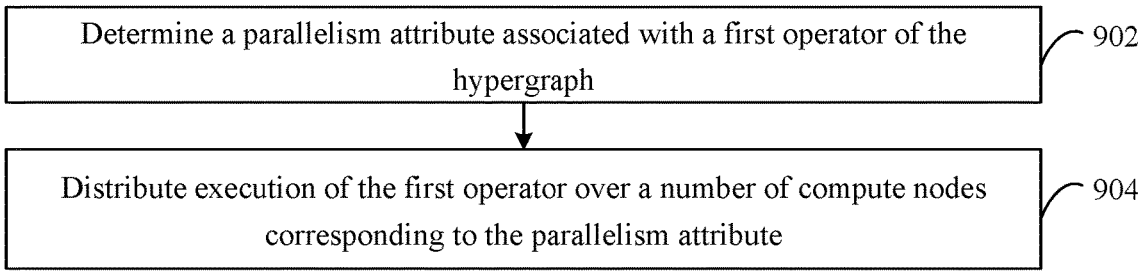
FIG. 9 shows a flowchart of a process for executing an operator with an associated parallelism attribute, in accordance with an embodiment.

As described above, hypergraph 218 may include a parallelism attribute for one or more operators that indicates a number of compute nodes over which the corresponding operator may be executed across for greater efficiency (due to parallel processing). FIG. 9 shows a flowchart 900 of a process for executing an operator with an associated parallelism attribute, in accordance with an embodiment. Query optimizer 136 and operator scheduler 210 may operate according to flowchart 900 in embodiments. Further structural and operational embodiments will be apparent to persons skilled in the relevant art(s) based on the following description of FIG. 9.

Flowchart 900 begins with step 902. In step 902, a parallelism attribute associated with a first operator of the hypergraph is determined. Query optimizer 136, in an embodiment, may be configured to determine parallelism attributes for each operator of received user query 148. Different operators may have the same or different parallelism attribute values than other operators.

In step 904, execution of the first operator is distributed over a number of compute nodes corresponding to the parallelism attribute. As described above, the parallelism attribute indicates a number of compute nodes to be used to execute the associated operator. In an embodiment, operator scheduler 210 may schedule execution of an operator over a number of compute nodes corresponding to the parallelism attribute. For instance, operator scheduler 210 may generate operator schedule 210 to indicate the number of compute nodes across which an operator is to be executed.

In embodiments, the model of separating DAG execution intent capturing precedence constraints and orchestrating them from actual execution of the operator enables us to better formalize failure domains and therefore ensure a fault tolerant execution, better explain execution sequence and even learn to reorder execution sequences. Embodiments enable this to be accomplished with low memory footprint by using a flyweight pattern of state machine execution and simply having the definition intent go through the prescribed states. Coupling this with hypergraph representation and sequencing of operators in the hypergraph enables the flexibility to order/reorder execution sequences dynamically throughout query executions.

Accordingly, hierarchical state machine 222 enables failure detection and retries with minimal re-execution impact. Failure detector 212, in an embodiment, is configured to detect execution failures of operators and to cause resolution thereof based on hierarchical state machine 222. Hierarchical DAG composition further enables expression of scoped dependencies by failure detector 212. For instance, if an operator were to fail, the scope of failure may be determined by failure detector 212 as the operator itself and the composite state of which the operator is part, thus limiting reschedules to that determined scope rather than inefficient, larger scale reschedules of operators. In another embodiment, an operator failing execution, and all of its dependencies, may be considered the scope of the failure.

Failure detector 212 may further include a history tracker to capture the trail of execution. Such a history tracker enables the ability to replay execution and explain execution order. A benefit of a state machine driven execution model is the ability to replay the execution of the DAG by simply orchestrating the execution intent based on execution history.

Figure 10:
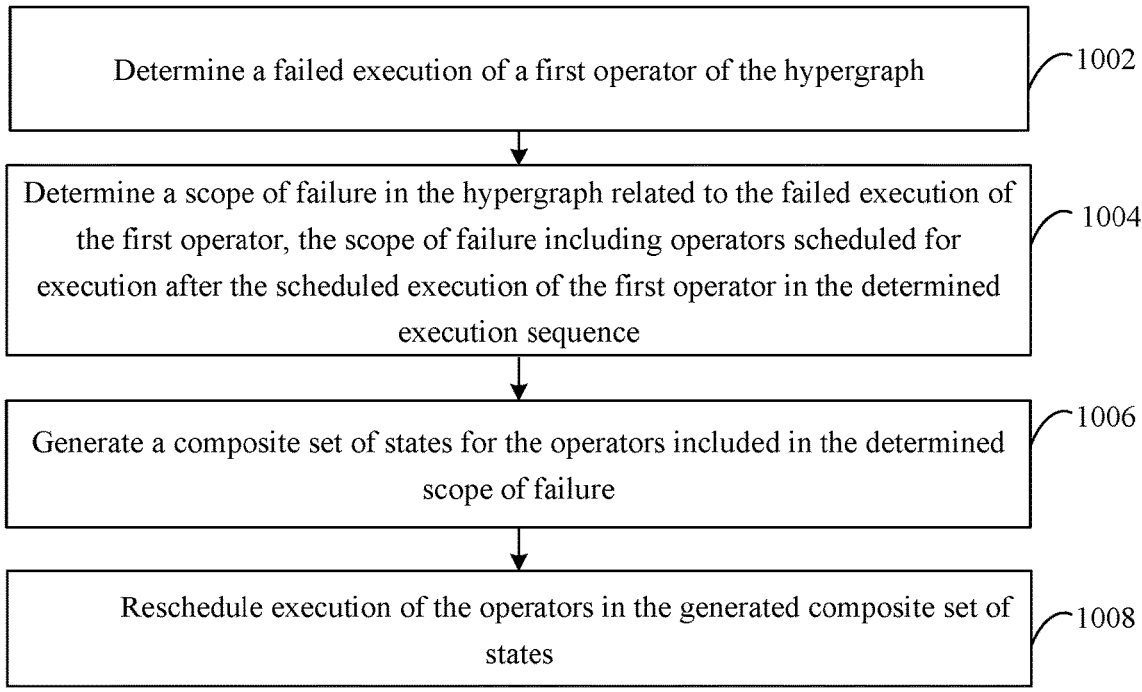
FIG. 10 shows a flowchart of a process for analyzing and rescheduling failed query execution, in accordance with an embodiment.

These and further functions of failure detector 212 are described with respect to FIG. 10. FIG. 10 shows a flowchart 1000 of a process for analyzing and rescheduling failed query execution, in accordance with an embodiment. Query processor 112 of FIGS. 1 and 2 may operate according to flowchart 1000 in embodiments. Further structural and operational embodiments will be apparent to persons skilled in the relevant art(s) based on the following description of FIG. 10, which is made with reference to FIG. 2 for purposes of illustration.

Flowchart 1000 begins with step 1002. In step 1002, a failed execution of a first operator of the hypergraph is determined. As shown in FIG. 2, failure detector 212 may determine a failed execution has occurred for an operator of hierarchical state machine 222. For example, any of cluster 138, cluster manager 214, or operator scheduler 210 notify failure detector 212 when a failure has occurred by an operator in the executing workload.

In step 1004, a scope of failure in the hypergraph related to the failed execution of the first operator is determined, the scope of failure including operators scheduled for execution after the scheduled execution of the first operator in the selected execution sequence. In an embodiment, failure detector 212 is configured to determine the scope of failure related to a failed operator execution. For instance, failure detector 212 may analyze hierarchical state machine 222 for the failed operator, and then for the scope of failure related to the operator. For instance, further operators/tasks (parent operators) that depend on the results of the failed operator, which are scheduled for execution after the failed operator, may be included in the failure scope. The failure scope may be generated by failure detector 212 as failure scope 220, which indicates the failed operator(s) and any further operators/tasks dependent thereon.

In step 1006, a composite set of states for the operators included in the determined scope of failure is generated. In an embodiment, failure detector 212 may determine from hierarchical state machine 222 and include in failure scope 220 the composite set of states related to the operators/tasks included in the determined scope of failure for the failure operator. Failure detector 212 may provide failure scope 220 to state machine generator 206, which may then update hierarchical state machine 222 with indications of the failed operators/tasks such that they may be re-scheduled for execution.

In step 1008, execution of the operators in the generated composite set of states is rescheduled. In an embodiment, state machine generator 206 provides hierarchical state machine 222 updated with the failed set of operators/tasks along with their updated states to pipeline analyzer 208, which generates an updated version of the selected execution sequence based thereon. Operator scheduler 210 receives the selected execution sequence and accordingly reschedules execution, including the execution of the operators/tasks indicated in failure scope 220, in cluster 138.

Figure 11:
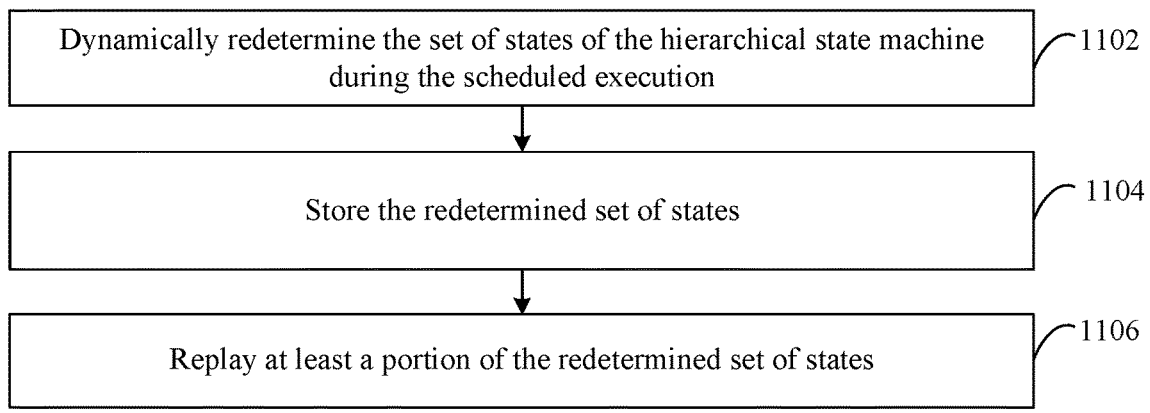
FIG. 11 shows a flowchart of a process for dynamic redetermination and re-execution of a hierarchical state machine configuration, in accordance with an embodiment.

Thus, as described above, hierarchical state machine 222 may be regenerated at various times, including in response to detected failures, when new queries are received that result in updates to hypergraph 218, etc. The updated hierarchical state machine 222 may then be replayed for purposes of analysis (further described elsewhere herein) or may be executed in cluster 138 as described above. For instance, FIG. 11 shows a flowchart 1100 of a process for dynamic redetermination and re-execution of a hierarchical state machine, in accordance with an embodiment. Query processor 112 of FIGS. 1 and 2 may operate according to flowchart 1100 in embodiments. Further structural and operational embodiments will be apparent to persons skilled in the relevant art(s) based on the following description of FIG. 11, which is made with reference to FIG. 2 for purposes of illustration.

Flowchart 1100 begins with step 1102. In step 1102, the set of states of the hierarchical state machine are dynamically redetermined during the scheduled execution. In an embodiment, hypergraph workload manager 134 may dynamically redetermine the state of each operator of hierarchical state machine 222 throughout execution. For instance, state machine generator 206 may redetermine hierarchical state machine 222 based on a failure scope 220 received from failure detector 212, based on an updated hypergraph 218 generated by hypergraph enlister 204, based on changes in operator states received from cluster 128, etc.

In step 1104, the redetermined set of states are stored. In an embodiment, hypergraph workload manager 134 may store the redetermined set of states as hierarchical state machine 222 in any suitable storage accessible to query processor 112.

In step 1106, at least a portion of the redetermined set of states are replayed. In an embodiment, pipeline analyzer 208 may be configured to replay at least a portion of the redetermined set of states. Pipeline analyzer 208 may replay the redetermined states of hierarchical state machine 222 as to determine the selected execution sequence. In another embodiment, a secondary query processor (not shown in FIG. 2) may play the redetermined set of states of hierarchical state machine 222, which may enable the secondary query processor to take over execution of hypergraph 218/hierarchical state machine 222 in cluster 138 in the event of a failure in query processor 112.

V. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
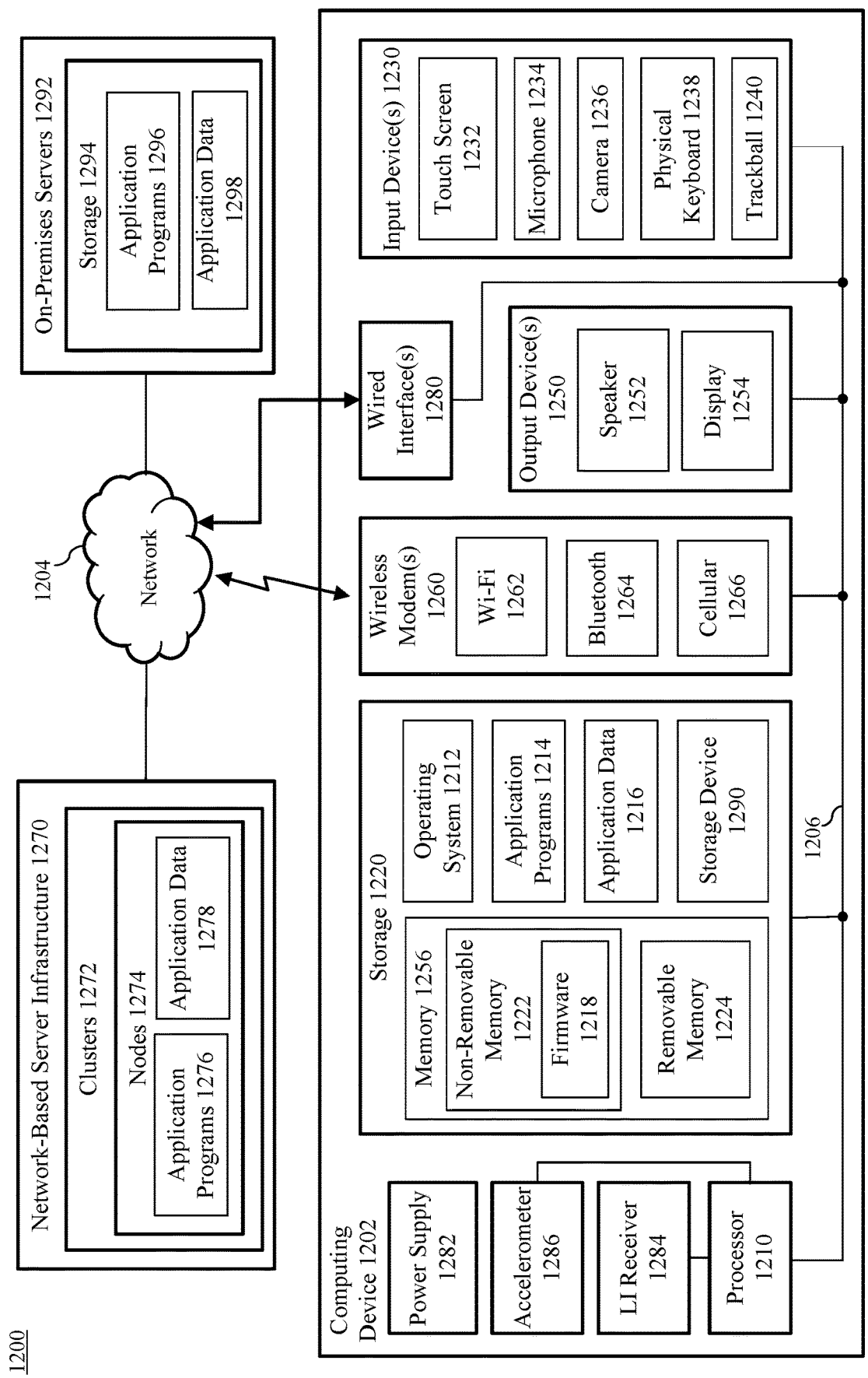
FIG. 12 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 12. FIG. 12 shows a block diagram of an exemplary computing environment 1200 that includes a computing device 1202. Computing devices 102A-102B and nodes 120A-120N and 122A-122N may each include one or more of the components of computing device 1202. In some embodiments, computing device 1202 is communicatively coupled with devices (not shown in FIG. 12) external to computing environment 1200 via network 1204. Network 1204 is an example of network 106 of FIG. 1. Network 1204 comprises one or more networks such as local area networks (LANs), wide area networks (WANs), enterprise networks, the Internet, etc., and may include one or more wired and/or wireless portions. Network 1204 may additionally or alternatively include a cellular network for cellular communications. Computing device 1002 is described in detail as follows.

Computing device 1202 can be any of a variety of types of computing devices. For example, computing device 1202 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1202 may alternatively be a stationary computing device such as a desktop computer, a personal computer (PC), a stationary server device, a minicomputer, a mainframe, a supercomputer, etc.

As shown in FIG. 12, computing device 1202 includes a variety of hardware and software components, including a processor 1210, a storage 1220, one or more input devices 1230, one or more output devices 1250, one or more wireless modems 1260, one or more wired interfaces 1280, a power supply 1282, a location information (LI) receiver 1284, and an accelerometer 1286. Storage 1220 includes memory 1256, which includes non-removable memory 1222 and removable memory 1224, and a storage device 1290. Storage 1220 also stores an operating system 1212, application programs 1214, and application data 1216. Wireless modem(s) 1260 include a Wi-Fi modem 1262, a Bluetooth modem 1264, and a cellular modem 1266. Output device(s) 1250 includes a speaker 1252 and a display 1254. Input device(s) 1230 includes a touch screen 1232, a microphone 1234, a camera 1236, a physical keyboard 1238, and a trackball 1240. Not all components of computing device 1202 shown in FIG. 12 are present in all embodiments, additional components not shown may be present, and any combination of the components may be present in a particular embodiment. These components of computing device 1202 are described as follows.

A single processor 1210 (e.g., central processing unit (CPU), microcontroller, a microprocessor, signal processor, ASIC (application specific integrated circuit), and/or other physical hardware processor circuit) or multiple processors 1210 may be present in computing device 1202 for performing such tasks as program execution, signal coding, data processing, input/output processing, power control, and/or other functions. Processor 1210 may be a single-core or multi-core processor, and each processor core may be single-threaded or multithreaded (to provide multiple threads of execution concurrently). Processor 1210 is configured to execute program code stored in a computer readable medium, such as program code of operating system 1212 and application programs 1214 stored in storage 1220. Operating system 1212 controls the allocation and usage of the components of computing device 1202 and provides support for one or more application programs 1214 (also referred to as "applications" or "apps"). Application programs 1214 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1202 can communicate with any other component according to function, although not all connections are shown for case of illustration. For instance, as shown in FIG. 12, bus 1206 is a multiple signal line communication medium (e.g., conductive traces in silicon, metal traces along a motherboard, wires, etc.) that may be present to communicatively couple processor 1210 to various other components of computing device 1202, although in other embodiments, an alternative bus, further buses, and/or one or more individual signal lines may be present to communicatively couple components. Bus 1206 represents one or more of any of several types of bus structures, including a memory bus or memory controller, a peripheral bus, an accelerated graphics port, and a processor or local bus using any of a variety of bus architectures.

Storage 1220 is physical storage that includes one or both of memory 1256 and storage device 1290, which store operating system 1212, application programs 1214, and application data 1216 according to any distribution. Non-removable memory 1222 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1222 may include main memory and may be separate from or fabricated in a same integrated circuit as processor 1210. As shown in FIG. 12, non-removable memory 1222 stores firmware 1218, which may be present to provide low-level control of hardware. Examples of firmware 1218 include BIOS (Basic Input/Output System, such as on personal computers) and boot firmware (e.g., on smart phones). Removable memory 1224 may be inserted into a receptacle of or otherwise coupled to computing device 1202 and can be removed by a user from computing device 1202. Removable memory 1224 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1290 may be present that are internal and/or external to a housing of computing device 1202 and may or may not be removable. Examples of storage device 1290 include a hard disk drive, a SSD, a thumb drive (e.g., a USB (Universal Serial Bus) flash drive), or other physical storage device.

One or more programs may be stored in storage 1220. Such programs include operating system 1212, one or more application programs 1214, and other program modules and program data. Examples of such application programs may include, for example, computer program logic (e.g., computer program code/instructions) for implementing one or more of management service 108, query optimizer 136, query processor 112, hypergraph workload manager 134, hypergraph enlister 204, state machine generator 206, pipeline analyzer 208, operator scheduler 210, failure detector 212, and cluster manager 214, along with any components and/or subcomponents thereof, as well as the flowcharts/flow diagrams (e.g., flowcharts 300, 500, 800, 900, 1000, and 1100) described herein, including portions thereof, and/or further examples described herein.

Storage 1220 also stores data used and/or generated by operating system 1212 and application programs 1214 as application data 1216. Examples of application data 1216 include web pages, text, images, tables, sound files, video data, and other data, which may also be sent to and/or received from one or more network servers or other devices via one or more wired or wireless networks. Storage 1220 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1202 through one or more input devices 1230 and may receive information from computing device 1202 through one or more output devices 1250. Input device(s) 1230 may include one or more of touch screen 1232, microphone 1234, camera 1236, physical keyboard 1238 and/or trackball 1240 and output device(s) 1250 may include one or more of speaker 1252 and display 1254. Each of input device(s) 1230 and output device(s) 1250 may be integral to computing device 1202 (e.g., built into a housing of computing device 1202) or external to computing device 1202 (e.g., communicatively coupled wired or wirelessly to computing device 1202 via wired interface(s) 1280 and/or wireless modem(s) 1260). Further input devices 1230 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1254 may display information, as well as operating as touch screen 1232 by receiving user commands and/or other information (e.g., by touch, finger gestures, virtual keyboard, etc.) as a user interface. Any number of each type of input device(s) 1230 and output device(s) 1250 may be present, including multiple microphones 1234, multiple cameras 1236, multiple speakers 1252, and/or multiple displays 1254.

One or more wireless modems 1260 can be coupled to antenna(s) (not shown) of computing device 1202 and can support two-way communications between processor 1210 and devices external to computing device 1202 through network 1204, as would be understood to persons skilled in the relevant art(s). Wireless modem 1260 is shown generically and can include a cellular modem 1266 for communicating with one or more cellular networks, such as a GSM network for data and voice communications within a single cellular network, between cellular networks, or between the mobile device and a public switched telephone network (PSTN). Wireless modem 1260 may also or alternatively include other radio-based modem types, such as a Bluetooth modem 1264 (also referred to as a "Bluetooth device") and/or Wi-Fi 1262 modem (also referred to as an "wireless adaptor"). Wi-Fi modem 1262 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1264 is configured to communicate with another Bluetooth-capable device according to the Bluetooth short-range wireless technology standard(s) such as IEEE 802.15.1 and/or managed by the Bluetooth Special Interest Group (SIG).

Computing device 1202 can further include power supply 1282, LI receiver 1284, accelerometer 1286, and/or one or more wired interfaces 1280. Example wired interfaces 1280 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1280 of computing device 1202 provide for wired connections between computing device 1202 and network 1204, or between computing device 1202 and one or more devices/peripherals when such devices/peripherals are external to computing device 1202 (e.g., a pointing device, display 1254, speaker 1252, camera 1236, physical keyboard 1238, etc.). Power supply 1282 is configured to supply power to each of the components of computing device 1202 and may receive power from a battery internal to computing device 1202, and/or from a power cord plugged into a power port of computing device 1202 (e.g., a USB port, an A/C power port). LI receiver 1284 may be used for location determination of computing device 1202 and may include a satellite navigation receiver such as a Global Positioning System (GPS) receiver or may include other type of location determiner configured to determine location of computing device 1202 based on received information (e.g., using cell tower triangulation, etc.). Accelerometer 1286 may be present to determine an orientation of computing device 1202.

Note that the illustrated components of computing device 1202 are not required or all-inclusive, and fewer or greater numbers of components may be present as would be recognized by one skilled in the art. For example, computing device 1202 may also include one or more of a gyroscope, barometer, proximity sensor, ambient light sensor, digital compass, etc. Processor 1210 and memory 1256 may be co-located in a same semiconductor device package, such as being included together in an integrated circuit chip, FPGA, or system-on-chip (SOC), optionally along with further components of computing device 1202.

In embodiments, computing device 1202 is configured to implement any of the above-described features of flowcharts herein. Computer program logic for performing any of the operations, steps, and/or functions described herein may be stored in storage 1220 and executed by processor 1210.

In some embodiments, server infrastructure 1270 may be present in computing environment 1200 and may be communicatively coupled with computing device 1202 via network 1204. Server infrastructure 1270, when present, may be a network-accessible server set (e.g., a cloud-based environment or platform). As shown in FIG. 12, server infrastructure 1270 includes clusters 1272. Each of clusters 1272 may comprise a group of one or more compute nodes and/or a group of one or more storage nodes. For example, as shown in FIG. 12, cluster 1272 includes nodes 1274. Each of nodes 1274 are accessible via network 1204 (e.g., in a "cloud-based" embodiment) to build, deploy, and manage applications and services. Any of nodes 1274 may be a storage node that comprises a plurality of physical storage disks, SSDs, and/or other physical storage devices that are accessible via network 1204 and are configured to store data associated with the applications and services managed by nodes 1274. For example, as shown in FIG. 12, nodes 1274 may store application data 1278.

Each of nodes 1274 may, as a compute node, comprise one or more server computers, server systems, and/or computing devices. For instance, a node 1274 may include one or more of the components of computing device 1202 disclosed herein. Each of nodes 1274 may be configured to execute one or more software applications (or "applications") and/or services and/or manage hardware resources (e.g., processors, memory, etc.), which may be utilized by users (e.g., customers) of the network-accessible server set. For example, as shown in FIG. 12, nodes 1274 may operate application programs 1276. In an implementation, a node of nodes 1274 may operate or comprise one or more virtual machines, with each virtual machine emulating a system architecture (e.g., an operating system), in an isolated manner, upon which applications such as application programs 1276 may be executed.

In an embodiment, one or more of clusters 1272 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1272 may be a datacenter in a distributed collection of datacenters. In embodiments, exemplary computing environment 1200 comprises part of a cloud-based platform such as Amazon Web Services® of Amazon Web Services, Inc., or Google Cloud Platform™ of Google LLC, although these are only examples and are not intended to be limiting.

In an embodiment, computing device 1202 may access application programs 1276 for execution in any manner, such as by a client application and/or a browser at computing device 1202. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1202 may additionally and/or alternatively synchronize copies of application programs 1214 and/or application data 1216 to be stored at network-based server infrastructure 1270 as application programs 1276 and/or application data 1278. For instance, operating system 1212 and/or application programs 1214 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1220 at network-based server infrastructure 1270.

In some embodiments, on-premises servers 1292 may be present in computing environment 1200 and may be communicatively coupled with computing device 1202 via network 1204. On-premises servers 1292, when present, are hosted within an organization's infrastructure and, in many cases, physically onsite of a facility of that organization. On-premises servers 1292 are controlled, administered, and maintained by IT (Information Technology) personnel of the organization or an IT partner to the organization. Application data 1298 may be shared by on-premises servers 1292 between computing devices of the organization, including computing device 1202 (when part of an organization) through a local network of the organization, and/or through further networks accessible to the organization (including the Internet). Furthermore, on-premises servers 1292 may serve applications such as application programs 1296 to the computing devices of the organization, including computing device 1202. Accordingly, on-premises servers 1292 may include storage 1294 (which includes one or more physical storage devices such as storage disks and/or SSDs) for storage of application programs 1296 and application data 1298 and may include one or more processors for execution of application programs 1296. Still further, computing device 1202 may be configured to synchronize copies of application programs 1214 and/or application data 1216 for backup storage at on-premises servers 1292 as application programs 1296 and/or application data 1298.

Embodiments described herein may be implemented in one or more of computing device 1202, network-based server infrastructure 1270, and on-premises servers 1292. For example, in some embodiments, computing device 1202 may be used to implement systems, clients, or devices, or components/subcomponents thereof, disclosed elsewhere herein. In other embodiments, a combination of computing device 1202, network-based server infrastructure 1270, and/or on-premises servers 1292 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk. SSD, other physical hardware media such as RAMs, ROMs, flash memory, digital video disks, zip disks, MEMs (microelectronic machine) memory, nanotechnology-based storage devices, and further types of physical/tangible hardware storage media of storage 1220. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1214) may be stored in storage 1220. Such computer programs may also be received via wired interface(s) 1280 and/or wireless modem(s) 1260 over network 1204. Such computer programs, when executed or loaded by an application, enable computing device 1202 to implement features of embodiments discussed herein. Accordingly, such computer programs represent controllers of the computing device 1202.

Embodiments are also directed to computer program products comprising computer code or instructions stored on any computer-readable medium or computer-readable storage medium. Such computer program products include the physical storage of storage 1220 as well as further physical storage types.

VI. Additional Example Embodiments

In one embodiment, a system comprises: a processor; and a memory device that stores program code structured to cause the processor to: receive a first user query; generate an independent first query graph representative of the first user query, the first query graph including at least one operator; enlist the first query graph into a hypergraph containing query graphs that are representative of user queries; and generate a hierarchical state machine based on the hypergraph that represents each operator in the hypergraph as a set of states.

In a one implementation of the system, wherein to enlist the first query graph into the hypergraph, the program code is further structured to cause the processor to: determine an instance of an operator present in both the first query graph and the hypergraph; and connect the first query graph into the hypergraph to share the operator.

In a further implementation of the system, the program code is further structured to cause the processor to: receive a second user query; generate an independent second query graph representative of the second user query, the second query graph including at least one operator; and enlist the second query graph into the hypergraph, each operator of the second query graph represented in the set of states in the hierarchical state machine.

In a further implementation of the system, the program code is further structured to cause the processor to: analyze the hypergraph at least by ordering and reordering execution of operators of the hypergraph to determine a plurality of execution sequences; select an execution sequence for the operators of the hypergraph based on comparisons of efficiencies of the execution sequences in the plurality of execution sequences; schedule execution of each operator of the hypergraph in assigned compute nodes based on the selected execution sequence to generate operator results; generate a query result for the first user query based at least on operator results related to the scheduled execution of the at least one operator of the first user query.

In an implementation of the aforementioned system, the program code is further structured to cause the processor to: determine a parallelism attribute associated with a first operator of the hypergraph; and distribute execution of the first operator over a number of compute nodes corresponding to the parallelism attribute.

In a further implementation of the aforementioned system, the program code is further structured to cause the processor to: determine a failed execution of a first operator of the hypergraph; determine a scope of failure in the hypergraph related to the failed execution of the first operator, the scope of failure including operators scheduled for execution after the scheduled execution of the first operator in the selected execution sequence; generate a composite set of states for the operators included in the determined scope of failure; and reschedule execution of the operators in the generated composite set of states.

In a further implementation of the aforementioned system, the program code is further structured to cause the processor to: dynamically redetermine the set of states of the hierarchical state machine during the scheduled execution; store the redetermined set of states; and replay at least a portion of the redetermined set of states.

In one embodiment, a system comprises: a processor; and a memory device that stores program code to be executed by the processor, the program code comprising: a query optimizer configured to: receive a first user query, and generate an independent first query graph representative of the first user query, the first query graph including at least one operator; a hypergraph enlister configured to: enlist the first query graph into a hypergraph containing query graphs that are representative of user queries including the enlisted first query graph; and a state machine generator configured to: generate a hierarchical state machine based on the hypergraph that represents each operator in the hypergraph as a set of states.

In an implementation of the aforementioned system, wherein to enlist the first query graph into the hypergraph, the hypergraph enlister is further configured to: determine an instance of an operator present in both the first query graph and the hypergraph; and connect the first query graph into the hypergraph to share the operator.

In a further implementation of the aforementioned system, the query optimizer is further configured to: receive a second user query, and generate an independent second query graph representative of the second user query, the second query graph including at least one operator; and the hypergraph enlister is further configured to: enlist the second query graph into the hypergraph, each operator of the second query graph represented in the set of states in the hierarchical state machine.

In a further implementation of the aforementioned system, the program code further comprises: a pipeline analyzer configured to: analyze the hypergraph at least by ordering and reordering execution of operators of the hypergraph to determine a plurality of execution sequences, and select an execution sequence for the operators of the hypergraph based on comparisons of efficiencies of the execution sequences in the plurality of execution sequences; and an operator scheduler configured to: schedule execution of each operator of the hypergraph in assigned compute nodes based on the selected execution sequence to generate operator results, and cause generation of a query result for the first user query based at least on operator results related to the scheduled execution of the at least one operator of the first user query.

In a further implementation of the aforementioned system, the query optimizer is further configured to: determine a parallelism attribute associated with a first operator of the hypergraph; and the operator scheduler is further configured to: distribute execution of the first operator over a number of compute nodes corresponding to the parallelism attribute.

In a further implementation of the aforementioned system, the program code further comprising: a failure detector configured to: determine a failed execution of a first operator of the hypergraph, and determine a scope of failure in the hypergraph related to the failed execution of the first operator, the scope of failure including operators scheduled for execution after the scheduled execution of the first operator in the selected execution sequence; the state machine generator is further configured to: generate a composite set of states for the operators included in the determined scope of failure; and the operator scheduler is further configured to: reschedule execution of the operators in the generated composite set of states.

In one embodiment, a method comprises: receiving a first user query; generating an independent first query graph representative of the first user query, the first query graph including at least one operator; enlisting the first query graph into a hypergraph containing query graphs that are representative of user queries including the enlisted first query graph; and generating a hierarchical state machine based on the hypergraph that represents each operator in the hypergraph as a set of states.

In an implementation of the method, said enlisting comprises: determining an instance of an operator present in both the first query graph and the hypergraph; and connecting the first query graph into the hypergraph to share the operator.

In a further implementation of the method, the method further comprises: receiving a second user query; generating an independent second query graph representative of the second user query, the second query graph including at least one operator; and enlisting the second query graph into the hypergraph, each operator of the second query graph represented in the set of states in the hierarchical state machine.

In a further implementation of the method, the method further comprises: analyzing the hypergraph at least by ordering and reordering execution of operators of the hypergraph to determine a plurality of execution sequences; selecting an execution sequence for the operators of the hypergraph based on comparisons of efficiencies of the execution sequences in the plurality of execution sequences; scheduling execution of each operator of the hypergraph in assigned compute nodes based on the selected execution sequence to generate operator results; generating a query result for the first user query based at least on operator results related to the scheduled execution of the at least one operator of the first user query.

In an implementation of the aforementioned method, the method further comprises: determining a parallelism attribute associated with a first operator of the hypergraph; and distributing execution of the first operator over a number of compute nodes corresponding to the parallelism attribute.

In a further implementation of the aforementioned method, the method further comprises: determining a failed execution of a first operator of the hypergraph; determining a scope of failure in the hypergraph related to the failed execution of the first operator, the scope of failure including operators scheduled for execution after the scheduled execution of the first operator in the selected execution sequence; generating a composite set of states for the operators included in the determined scope of failure; and rescheduling execution of the operators in the generated composite set of states.

In a further implementation of the aforementioned method, the method further comprises: dynamically redetermining the set of states of the hierarchical state machine during the scheduled execution; storing the redetermined set of states; and replaying at least a portion of the redetermined set of states.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

For example, running examples have been described with respect to malicious activity detectors determining whether compute resource creation operations potentially correspond to malicious activity. However, it is also contemplated herein that malicious activity detectors may be used to determine whether other types of control plane operations potentially correspond to malicious activity.

Several types of impactful operations have been described herein; however, lists of impactful operations may include other operations, such as, but not limited to, accessing enablement operations, creating and/or activating new (or previously-used) user accounts, creating and/or activating new subscriptions, changing attributes of a user or user group, changing multi-factor authentication settings, modifying federation settings, changing data protection (e.g., encryption) settings, elevating another user account's privileges (e.g., via an admin account), retriggering guest invitation e-mails, and/or other operations that impact the cloud-base system, an application associated with the cloud-based system, and/or a user (e.g., a user account) associated with the cloud-based system.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
a processor; and
a memory device that stores program code structured to cause the processor to:
receive a first user query,
generate an independent first query graph representative of the first user query, the first query graph comprising at least one operator,
enlist the first query graph into a hypergraph containing query graphs that are representative of user queries including the enlisted first query graph,
analyze the hypergraph at least by ordering and reordering execution of operators of the hypergraph, the analysis resulting in a plurality of execution sequences,
select, based at least on the analysis, a first execution sequence of the plurality of execution sequences, and
schedule execution of the first execution sequence.

2. The system of claim 1, wherein to enlist the first query graph into the hypergraph, the program code is further structured to cause the processor to:
determine an instance of an operator present in both the first query graph and the hypergraph; and
connect the first query graph into the hypergraph to share the operator.

3. The system of claim 1, wherein the program code is further structured to cause the processor to:
receive a second user query;
generate an independent second query graph representative of the second user query, the second query graph including at least one operator; and
enlist the second query graph into the hypergraph.

4. The system of claim 1, wherein
to select the first execution sequence of the plurality of execution sequences, the program code is structured to further cause the processor to:
compare a first efficiency of the first execution sequence to a second efficiency of a second execution sequence of the plurality of execution sequences, and
select the first execution sequence based on a result of the comparison of the first and second efficiencies; and
to schedule execution of the first execution sequence, the program code is structured to further cause the processor to:
schedule execution of each operator of the hypergraph in assigned compute nodes based on the first execution sequence to generate operator results, and
cause generation of a query result for the first user query based at least on operator results related to the scheduled execution of the at least one operator of the first user query.

5. The system of claim 4, wherein the program code is structured to further cause the processor to:
determine a parallelism attribute associated with a first operator of the hypergraph; and
distribute execution of the first operator over a number of compute nodes corresponding to the parallelism attribute.

6. The system of claim 4, the program code is structured to further cause the processor to:
determine a failed execution of a first operator of the hypergraph, and
determine a scope of failure in the hypergraph related to the failed execution of the first operator, the scope of failure including operators scheduled for execution after the scheduled execution of the first operator in the selected execution sequence;
generate a composite set of states for the operators included in the determined scope of failure; and
reschedule execution of the operators in the generated composite set of states.

7. The system of claim 1, wherein the program code is further structured to cause the processor to:
generate a hierarchical state machine based on the hypergraph that represents each operator in the hypergraph as a set of states.

8. The system of claim 7, wherein the program code is further structured to cause the processor to:
dynamically redetermine the set of states of the hierarchical state machine during the scheduled execution;
store the redetermined set of states; and
replay at least a portion of the redetermined set of states.

9. A method, comprising:
receiving a first user query;
generating an independent first query graph representative of the first user query, the first query graph comprising at least one operator;
enlisting the first query graph into a hypergraph containing query graphs that are representative of user queries including the enlisted first query graph;
analyzing the hypergraph at least by ordering and reordering execution of operators of the hypergraph, the analysis resulting in a plurality of execution sequences;
selecting, based at least on the analysis, a first execution sequence of the plurality of execution sequences; and
scheduling execution of the first execution sequence.

10. The method of claim 9, wherein said enlisting comprises:
determining an instance of an operator present in both the first query graph and the hypergraph; and
connecting the first query graph into the hypergraph to share the operator.

11. The method of claim 9, further comprising:
receiving a second user query;
generating an independent second query graph representative of the second user query, the second query graph including at least one operator; and
enlisting the second query graph into the hypergraph.

12. The method of claim 9, wherein:
said selecting the first execution sequence of the plurality of execution sequences comprises:
comparing a first efficiency of the first execution sequence to a second efficiency of a second execution sequence of the plurality of execution sequences, and
selecting the first execution sequence based on a result of said comparing the first and second efficiencies; and
said scheduling execution of the first execution sequence comprises:
scheduling execution of each operator of the hypergraph in assigned compute nodes based on the first execution sequence to generate operator results; and
generating a query result for the first user query based at least on operator results related to the scheduled execution of the at least one operator of the first user query.

13. The method of claim 12, further comprising:
determining a parallelism attribute associated with a first operator of the hypergraph; and
distributing execution of the first operator over a number of compute nodes corresponding to the parallelism attribute.

14. The method of claim 12, further comprising:
determining a failed execution of a first operator of the hypergraph;
determining a scope of failure in the hypergraph related to the failed execution of the first operator, the scope of failure including operators scheduled for execution after the scheduled execution of the first operator in the selected execution sequence;
generating a composite set of states for the operators included in the determined scope of failure; and
rescheduling execution of the operators in the generated composite set of states.

15. The method of claim 9, further comprising:
generating a hierarchical state machine based on the hypergraph that represents each operator in the hypergraph as a set of states.

16. The method of claim 15, further comprising:
dynamically redetermining the set of states of the hierarchical state machine during the scheduled execution;
storing the redetermined set of states; and
replaying at least a portion of the redetermined set of states.

17. A computer readable storage medium with program instructions encoded thereon, the program instructions structured to cause a processor to perform a method, the method comprising:
receiving a first user query;
generating an independent first query graph representative of the first user query, the first query graph comprising at least one operator;

enlisting the first query graph into a hypergraph containing query graphs that are representative of user queries including the enlisted first query graph;

analyzing the hypergraph at least by ordering and reordering execution of operators of the hypergraph, the analysis resulting in a plurality of execution sequences;

selecting, based at least on the analysis, a first execution sequence of the plurality of execution sequences; and scheduling execution of the first execution sequence.

18. The computer readable storage medium of claim 17, wherein the method further comprises:

receiving a second user query;

generating an independent second query graph representative of the second user query, the second query graph including at least one operator; and enlisting the second query graph into the hypergraph.

19. The computer readable storage medium of claim 17, wherein said selecting the first execution sequence of the plurality of execution sequences comprises:

comparing a first efficiency of the first execution sequence to a second efficiency of a second execution sequence of the plurality of execution sequences, and selecting the first execution sequence based on a result of said comparing the first and second efficiencies; and said scheduling execution of the first execution sequence comprises:

scheduling execution of each operator of the hypergraph in assigned compute nodes based on the first execution sequence to generate operator results; and generating a query result for the first user query based at least on operator results related to the scheduled execution of the at least one operator of the first user query.

20. The computer readable storage medium of claim 17, wherein the method further comprises:

determining an instance of an operator present in both the first query graph and the hypergraph; and connecting the first query graph into the hypergraph to share the operator.

\* \* \* \* \*